(12) United States Patent
Yamazaki

(10) Patent No.: US 8,300,702 B2
(45) Date of Patent: Oct. 30, 2012

(54) DATA PROCESSING APPARATUS, DATA PROCESSING METHOD, DATA PROCESSING PROGRAM, DATA STRUCTURE, RECORDING MEDIUM, REPRODUCING APPARATUS, REPRODUCING METHOD, AND REPRODUCING PROGRAM

(75) Inventor: Tatsuji Yamazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1646 days.

(21) Appl. No.: 11/712,291

(22) Filed: Feb. 28, 2007

(65) Prior Publication Data

US 2007/0206676 A1    Sep. 6, 2007

(30) Foreign Application Priority Data

Mar. 1, 2006  (JP) ................. 2006-054926

(51) Int. Cl.
*H04N 7/12* (2006.01)
*H04N 11/02* (2006.01)
*H04N 11/04* (2006.01)

(52) U.S. Cl. ......... 375/240.25; 375/240.01; 375/240.02; 375/240.03; 375/240.04; 375/240.05; 375/240.06; 375/240.12; 375/240.13; 375/240.14; 375/240.15; 375/240.16; 375/240.26

(58) Field of Classification Search ............... 375/240.25
See application file for complete search history.

(56) References Cited

U.S. PATENT DOCUMENTS

| | | | |
|---|---|---|---|
| 5,696,557 A | | 12/1997 | Yamashita et al. |
| 5,838,380 A | * | 11/1998 | Sun et al. ............ 375/240.14 |
| 5,945,931 A | | 8/1999 | Tahara et al. |
| 6,119,144 A | | 9/2000 | Fujita et al. |
| 2004/0052507 A1 | * | 3/2004 | Kondo et al. ............. 386/111 |
| 2004/0136461 A1 | * | 7/2004 | Kondo et al. .......... 375/240.16 |
| 2006/0039677 A1 | | 2/2006 | Ogikubo |
| 2006/0088286 A1 | | 4/2006 | Shibata et al. |
| 2006/0133770 A1 | | 6/2006 | Shibata et al. |
| 2006/0233533 A1 | | 10/2006 | Hosoya |

FOREIGN PATENT DOCUMENTS

| | | |
|---|---|---|
| JP | 7 236132 | 9/1995 |
| JP | 8-79688 | 3/1996 |
| JP | 11-205739 | 7/1999 |
| JP | 2000 83215 | 3/2000 |

(Continued)

OTHER PUBLICATIONS

Shinobu Ueda et al. "Development of MPEG2 Decoder for Magneto-Optical Disk Video Players." IEEE Transactions on Consumer Electronics, vol. 41, No. 3 (Aug. 1995): 521-528.*

*Primary Examiner* — Taghi Arani
*Assistant Examiner* — Narciso Victoria
(74) *Attorney, Agent, or Firm* — Frommer Lawrence & Haug LLP; William S. Frommer; Thomas F. Presson

(57) ABSTRACT

A data processing apparatus has: a decoding interval detecting unit detecting a second interval according to coding order of frames necessary to decode a first interval which is designated by display order of the frames in video data which has been compression-encoded by using an inter-frame compression according to a predictive coding; and a file forming unit forming a file to store the video data in the second interval detected by the decoding interval detecting unit. The file forming unit adds information showing the first interval by the frame display order to the file.

25 Claims, 21 Drawing Sheets

FOREIGN PATENT DOCUMENTS

| | | |
|---|---|---|
| JP | 2004-341635 | 12/2000 |
| JP | 2001 339678 | 12/2001 |
| JP | 2002 101379 | 4/2002 |
| JP | 2004-112769 | 4/2004 |
| JP | 2004-208319 | 7/2004 |
| JP | 2005 5916 | 1/2005 |
| JP | 3763172 | 1/2006 |
| JP | 2006 88286 | 4/2006 |
| JP | 3794429 | 4/2006 |
| JP | 2006 157867 | 6/2006 |

* cited by examiner

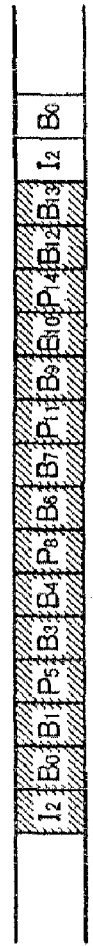
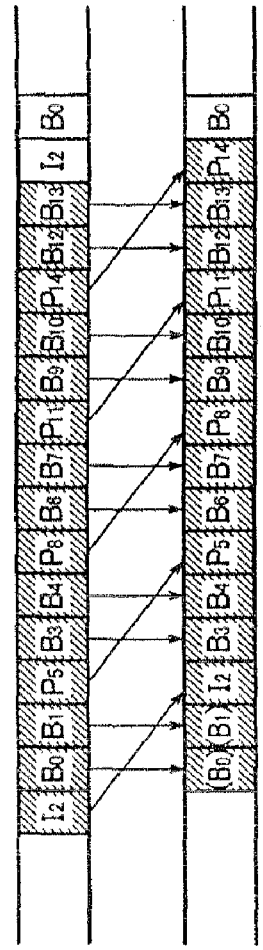
Fig. 1A
Fig. 1B
Fig. 1C
RELATED ART

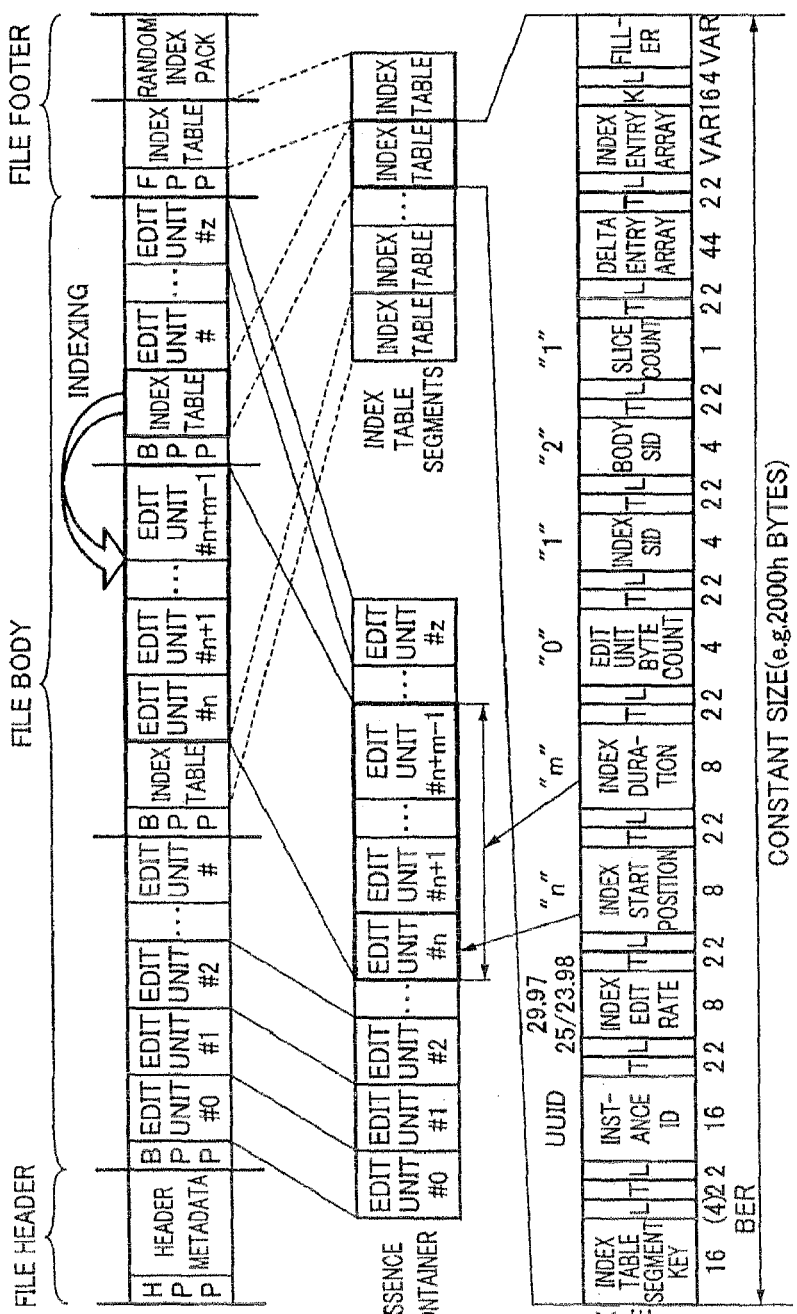

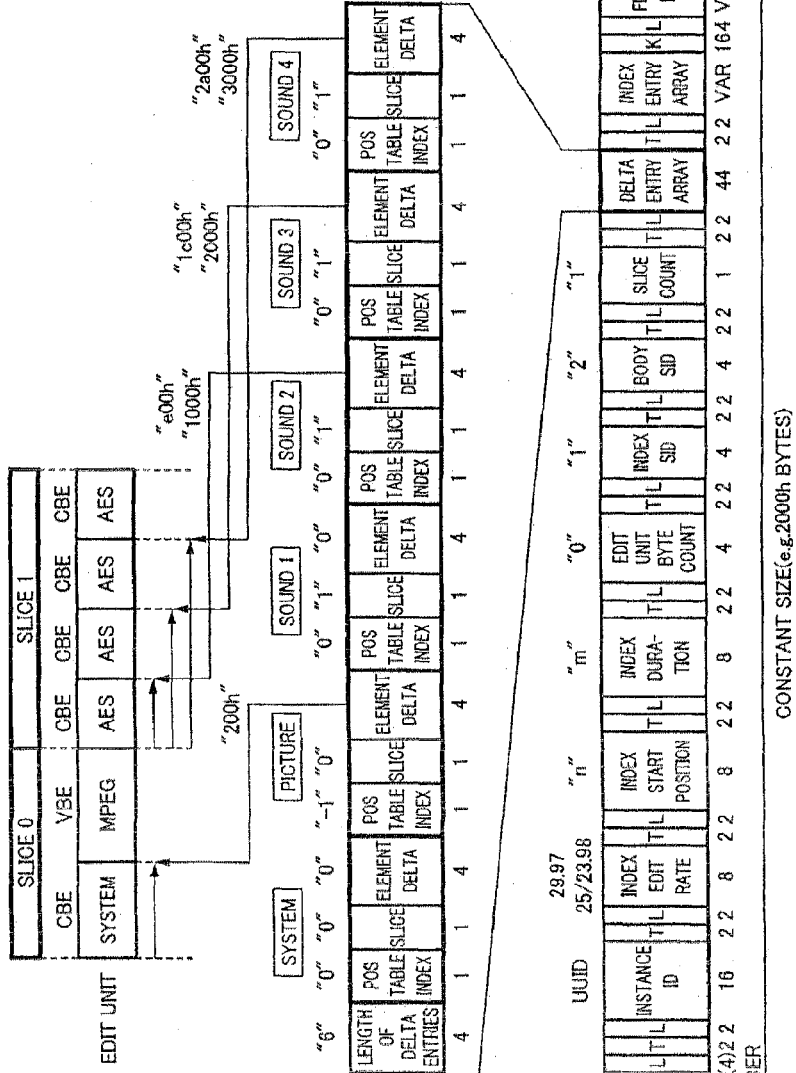

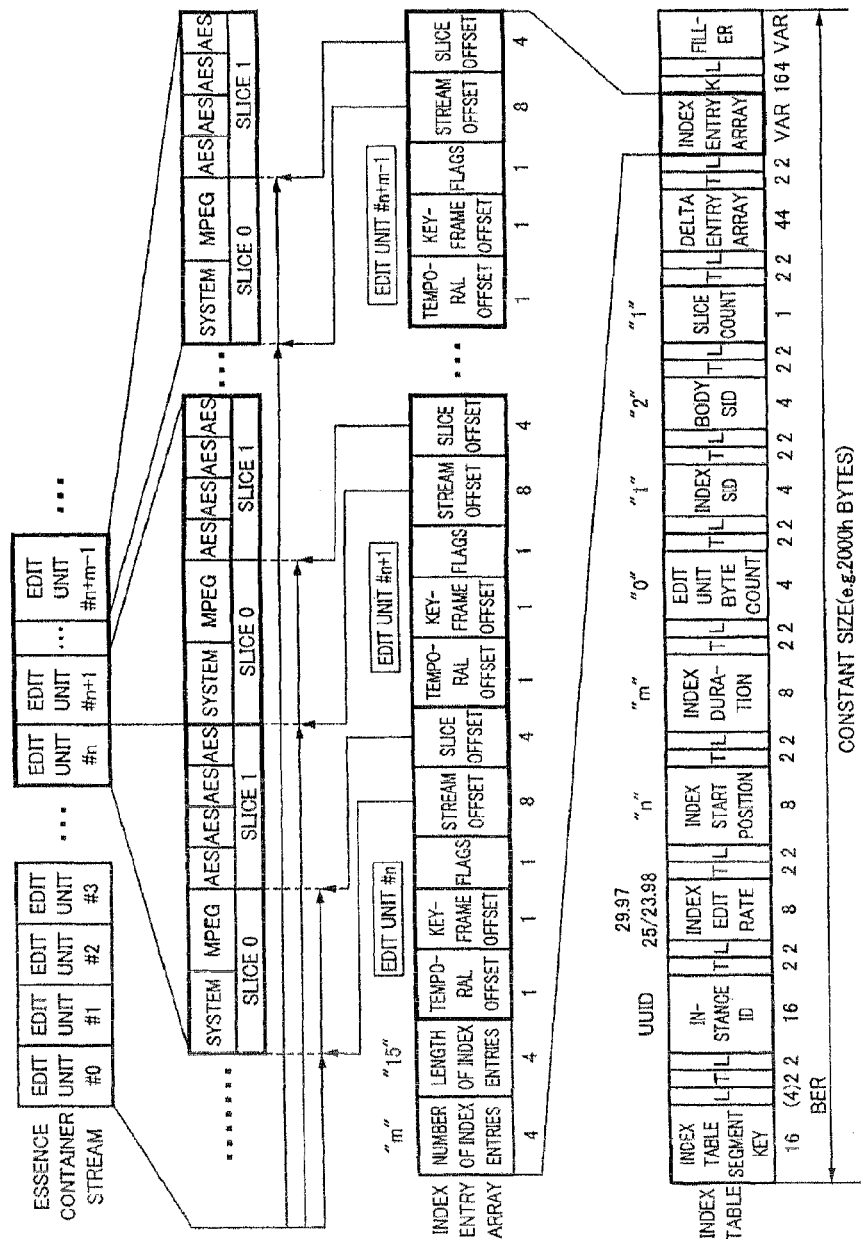

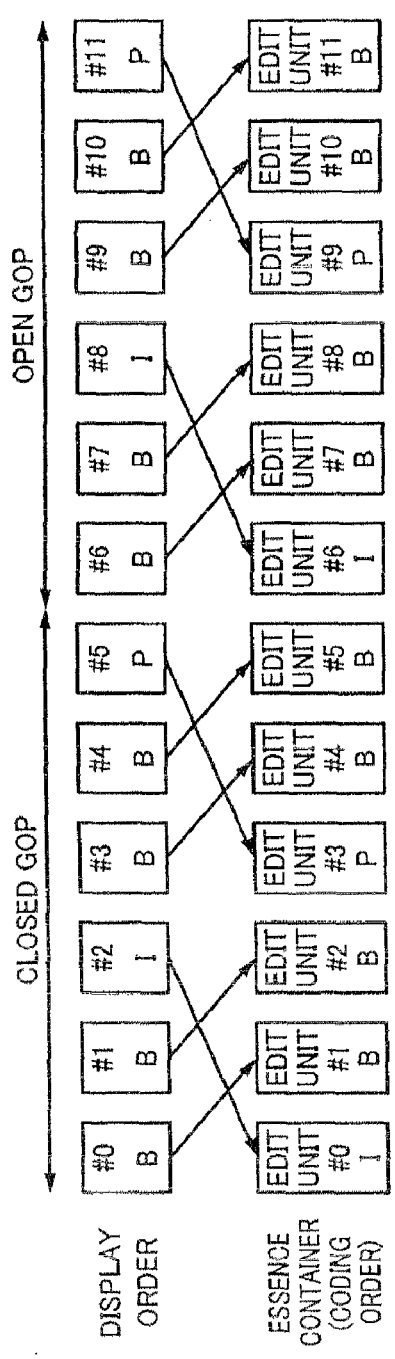

Fig. 6

| 7TH BIT | RANDOM ACCESS(SEQUENCE_HEADER&CLOSED GOP) |
|---|---|
| 6TH BIT | SEQUENCE_HEADER |
| 5TH BIT | FORWARD PREDICTION |
| 4TH BIT | BACKWARD PREDICTION |
| 3RD BIT | OFFSET OUT OF RANGE |
| 2ND BIT | NOT USED BY MPEG MAPPING |
| 1ST&0TH BITS | 00:I-FRAME, 10:P-FRAME, 11:B-FRAME |

Fig.7A WHOLE FILE

Fig.7B PARTIAL TRANSFER FILE

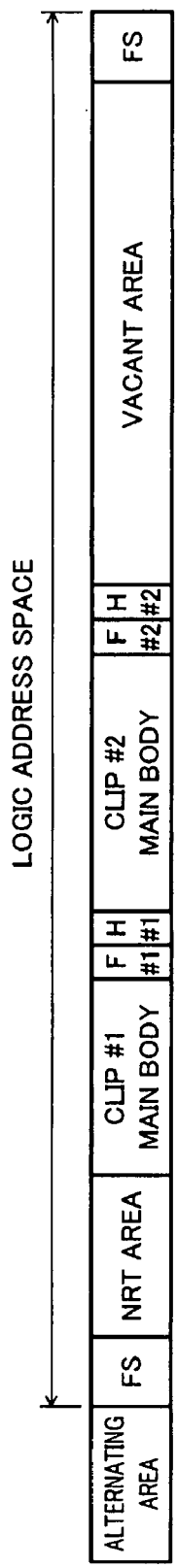

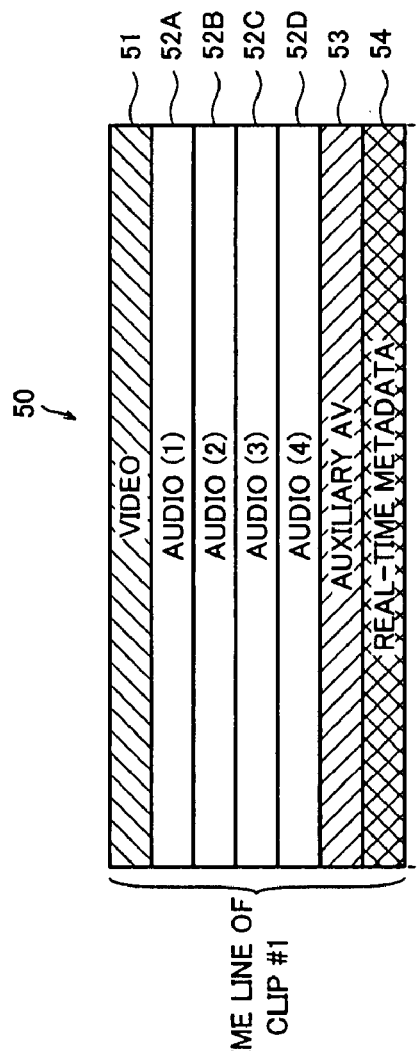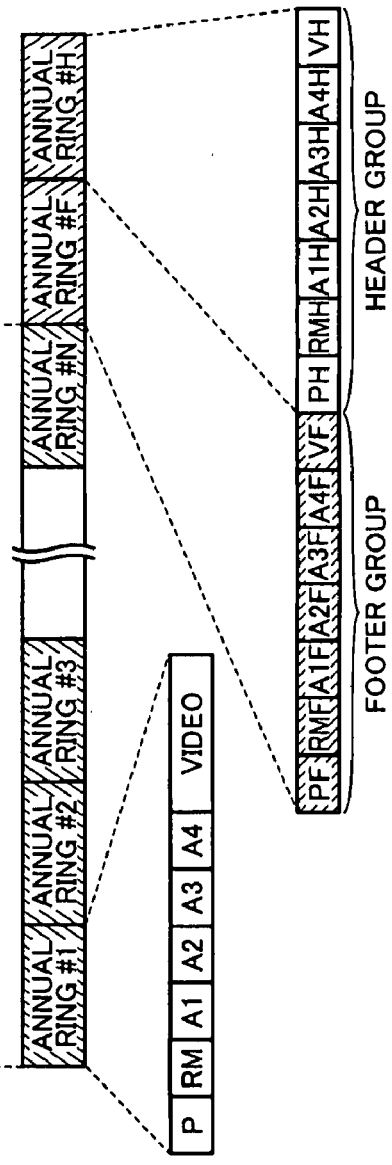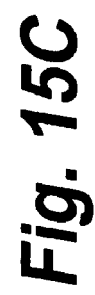

DATA PROCESSING APPARATUS, DATA PROCESSING METHOD, DATA PROCESSING PROGRAM, DATA STRUCTURE, RECORDING MEDIUM, REPRODUCING APPARATUS, REPRODUCING METHOD, AND REPRODUCING PROGRAM

CROSS REFERENCES TO RELATED APPLICATIONS

The present invention contains subject matter related to Japanese Patent Application JP 2006-054926 filed in the Japanese Patent Office on Mar. 1, 2006, the entire contents of which being incorporated herein by reference.

BACKGROUND OF THE INVENTION

1. Field of the Invention

The invention relates to a data processing apparatus, a data processing method, a data processing program, a data structure, a recording medium, a reproducing apparatus, a reproducing method, and a reproducing program which are suitable to be used when video data which has been compression-encoded by using an inter-frame compression is partially transferred.

2. Description of the Related Arts

A data recording and reproducing apparatus for recording a digital video signal and a digital audio signal onto a recording medium and reproducing such signals from the recording medium has been known. As a recording medium for recording the digital video signal and the digital audio signal, in recent years, a recording medium such as optical disc, hard disk, semiconductor memory, and the like in which a random access can be performed has widely been used for recording and reproducing the digital video signal and the digital audio signal.

Since the digital video signal has a very large data capacity, generally, it is compression-encoded by a predetermined system and recorded onto the recording medium. In recent years, an MPEG2 (Moving Picture Experts Group 2) system has been known as a standard compression encoding system. In the MPEG2, the digital video signal is compression-encoded by using a DCT (Discrete Cosine Transform) and a motion compensation and a data compression ratio is further raised by using a variable length code.

A data stream structure of the MPEG2 will now be schematically described. The MPEG2 is constructed by combining a motion compensation predictive coding and a compression encoding according to the DCT. A data structure of the MPEG2 has a layer structure constructed by a block layer, a macro block layer, a slice layer, a picture layer, a GOP layer, and a sequence layer from the lower order. The block layer is constructed by a DCT block serving as a unit of executing the DCT. The macro block layer is constructed by a plurality of DCT blocks. The slice layer is constructed by a header portion and one or more macro blocks. The picture layer is constructed by a header portion and one or more slices. The picture corresponds to one picture plane. A boundary between the layers can be discriminated by a predetermined identification code (ID code).

The GOP layer is constructed by a header portion, an I (Intra-coded) picture as a picture based on an intra-frame coding, and a P (Predictive-coded) picture and a B (Bi-directionally predictive coded) picture as a picture based on a predictive coding. The I picture can be decoded only by its own information. The P picture needs a front image as a reference image and the B picture needs front and rear images as reference images. Each of the P and B pictures is not solely decoded. For example, the P picture is decoded by using the I picture or the P picture, as a reference image, which is time-precedent to its own P picture. The B picture is decoded by using the two I pictures or two P pictures before and after its own B picture as reference images. A group which includes at least one I picture and has been completed by itself is called a GOP (Group Of Picture) and is a minimum unit which can be independently accessed in the stream of the MPEG.

The GOP is constructed by one or a plurality of pictures. Hereinbelow, for convenience of explanation, the GOP constructed only by one I picture is called a single GOP and the GOP constructed by a plurality of pictures including the I picture and the P and/or B picture(s) is called a long GOP. By constructing the GOP only by one I picture, edition of a frame unit can be made easy and since the inter-frame predictive coding is not executed, higher picture quality can be obtained. In the long GOP, since the inter-frame predictive coding is executed, there is such an advantage that a compression efficiency is high.

In the long GOP, there are two kinds of GOPs: a closed GOP which can be completely decoded in the GOP and has a closed structure in the GOP; and an open GOP which can use information of the one-precedent GOP in the coding order upon decoding. Since the open GOP can be decoded by using information of an amount larger than that for the closed GOP, the high picture quality can be obtained. Therefore, the open GOP is generally used.

As a method of compression-encoding a video signal of an SD (Standard Definition) format, for example, a DV format whose bit rate is equal to 25 Mbps (megabits/second) or an IMX format whose bit rate is equal to 50 Mbps and which uses only the I picture of the MPEG2 has been known. Particularly, in a video apparatus which is used in a broadcasting station or the like, the video signal of the SD format is used by the foregoing single GOP, thereby realizing the high picture quality and an editing environment of high precision.

In recent years, in association with the execution of a digital high-definition broadcasting or the like, an HD (High Definition) format whose resolution is higher than that of the SD format has been used. According to the HD format, since a bit rate is high in association with the realization of the high resolution, according to the single GOP, it is difficult to execute the long-time recording to the recording medium. Therefore, the video signal in the HD format is used in the foregoing long GOP.

A decoding process in the case of the long GOP will now be described with reference to FIGS. 1A to 1C. It is assumed here that one GOP is constructed by 15 pictures in total of one I picture, four P pictures, and ten B pictures. Display order of the I, P, and B pictures in the GOP is set to "$B_0 B_1 I_2 B_3 B_4 P_5 B_6 B_7 P_8 B_9 B_{10} P_{11} B_{12} B_{13} P_{14}$" as shown in an example in FIG. 1A. Each suffix indicates the display order.

In this example, the first two $B_0$ and $B_1$ pictures are the pictures which have been predicted by using the last $P_{14}$ picture in the one-precedent GOP and the $I_2$ picture in the present GOP and decoded. The first $P_5$ picture in the GOP is the picture which has been predicted from the $I_2$ picture and decoded. Each of the other $P_8$, $P_{11}$, and $P_{14}$ pictures is the picture which has been predicted by using the one-precedent P picture and decoded. Each of the B pictures after the I picture is the picture which has been predicted from the front and rear I and/or P pictures and decoded.

Since the B picture is the picture which has been predicted by using the time-precedent and time-subsequent I or P pictures and decoded, it is necessary to decide the layout order of the I, P, and B pictures on the stream or the recording medium in consideration of decoding order in a decoder. That is, the I and/or P pictures to decode the B picture have to be typically decoded prior to the B picture.

In the above example, a layout of the pictures on the stream or the recording medium is set to "$I_2B_0B_1P_5B_3B_4P_8B_6B_7P_{11}B_9B_{10}P_{14}B_{12}B_{13}$" as shown in an example in FIG. 1B and the pictures are decoded in this order. Each suffix indicates the display order in correspondence to FIG. 1A.

In the decoding process in the decoder, as shown in FIG. 1C, first, the $I_2$ picture is decoded and the $B_0$ and $B_1$ pictures are predicted by using the decoded $I_2$ picture and the last (in the display order) $P_{14}$ picture in the one-precedent GOP and decoded. The $B_0$ and $B_1$ pictures are outputted from the decoder in the decoding order. Subsequently, the $I_2$ picture is outputted. When the $B_1$ picture is outputted, the $P_5$ picture is subsequently predicted by using the $I_2$ picture and decoded. The $B_3$ and $B_4$ pictures are predicted by using the $I_2$ and $P_5$ pictures and decoded. The decoded $B_3$ and $B_4$ pictures are outputted from the decoder in the decoding order. Subsequently, the $P_5$ picture is outputted.

In a manner similar to the above, such processes that the P or I picture which is used for prediction of the B picture is decoded prior to the B picture, the B picture is predicted by using the decoded P or I picture and decoded, the decoded B picture is outputted, and subsequently, the P or I picture used to decode the B picture is outputted are repeated. The picture layout as shown in FIG. 1B on the recording medium or the stream is generally used.

In recent years, a processing ability has remarkably been improved in computer apparatuses, particularly, in small and reasonable computer apparatuses such as personal computers. Therefore, the video data as mentioned above is often processed by the personal computer or the like. For example, the video data recorded by a recording and reproducing apparatus in which the random-accessible recording medium as mentioned above is used as a recording medium is reproduced by the recording and reproducing apparatus and transferred to the computer apparatus through a predetermined interface. Since the computer apparatus fundamentally handles the data on a file unit basis, the transmitted data is converted into a predetermined file format and stored into the recording medium such as a hard disk drive or the like.

In the recording and reproducing apparatus in which the random-accessible recording medium is used for recording of the video data, generally, the video data is preliminarily recorded in a file format into the recording medium. For example, in the case of using the optical disc as a recording medium, the optical disc is used in a format corresponding to that of the computer apparatus such as a UDF (Universal Disk Format) and the video data is recorded as a file according to the format of the UDF.

If the video data is recorded by the recording and reproducing apparatus into the recording medium formatted by the format corresponding to the computer apparatus as mentioned above, for example, when the recording and reproducing apparatus and the computer apparatus are connected by a predetermined interface, the computer apparatus can read out the video data by directly accessing the file on the recording medium.

A communicating speed of a communication network has also been remarkably improved in recent years and the video data can be transferred by the communication network. In the case of transferring the file by using the computer apparatus through the communication network, a protocol of the file transfer called an FTP (File Transfer Protocol) is generally used. For example, a technique for transferring the video file by using the FTP has been disclosed in the Official Gazette of U.S. Pat. No. 6,119,144.

SUMMARY OF THE INVENTION

A case where the video data recorded as a file in the recording medium is transmitted, for example, through the communication network will now be considered. For example, a case where the video data which has been photographed and by a video camera recorded on the reporting spot or the like is transmitted to a studio of a broadcasting station is considered.

A method of transmitting the whole one video file is considered in such a case. However, according to such a method, a data amount is large and, particularly, in the case of transmitting the data by the communication network such as Internet or the like, it takes a long time until completion of the transmission of one file.

It is, therefore, considered to extract only the necessary portions from the video data stored in the video file and transfer the extracted portions as a file. The operation to partially extract the video data from the whole file and transfer it is hereinbelow called "partial transfer". For example, edit points such as IN point and OUT point are temporarily designated for the video data obtained by photographing on the spot side where the photographing operation has been executed and the video data between the designated IN point and OUT point is transferred as a file.

In the SD format of the single GOP used in the related art, since the video data has been compression-encoded every frame, the process for partially extracting the video data from the whole file can be easily executed.

In the HD format of the long GOP, as mentioned above, the compression encoding is performed by using the correlation among the frames and the P and B pictures which are decoded by using the time-precedent and/or the time-subsequent pictures are included in the video data. It is, therefore, necessary to transfer the necessary data by being aware of the structure of the GOP when the video data is partially transferred.

For example, when a certain range of the video data which has been compression-encoded by using the long GOP is extracted and transferred, it is necessary to partially transfer the data together with the pictures which are used to decode the range-designated pictures so that the transferred video data can be decoded on the transfer destination side.

Since the pictures out of the designated range are transferred in addition to the transfer-designated pictures, it is also necessary to transfer information showing the designated range together with the partially-transferred video data. Further, in the long GOP, since a data size of each picture is not constant and a boundary between the video frames fluctuates, a mechanism which can recognize such a boundary is also necessary with respect to the partially-transferred file.

However, in the related art, there is such a problem that a mechanism which is necessary when the video data which has been compression-encoded by the long GOP is partially-transferred is not provided.

It is, therefore, desirable to provide a data processing apparatus, a data processing method, a data processing program, a data structure, a recording medium, a reproducing apparatus, a reproducing method, and a reproducing program which can easily execute such a process for partially extracting video data which has been compression-encoded by using a long GOP from a file in which the video data has been stored and transferring the video data.

According to an embodiment of the present invention, there is provided a data processing apparatus comprising: a decoding interval detecting unit detecting a second interval according to coding order of frames necessary to decode a first interval which is designated by display order of the frames in video data which has been compression-encoded by using an inter-frame compression according to a predictive coding; and a file forming unit forming a file to store the video data in the second interval detected by the decoding interval detecting unit, wherein the file forming unit adds information showing the first interval by the frame display order to the file.

According to another embodiment of the present invention, there is provided a data processing method comprising the steps of: detecting a second interval according to coding order of frames necessary to decode a first interval which is designated by display order of the frames in video data which has been compression-encoded by using an inter-frame compression according to a predictive coding; and forming a file to store the video data in the detected second interval, wherein the file forming step includes a step of adding information showing the first interval by the frame display order to the file.

According to still another embodiment of the present invention, there is provided a data processing program for allowing a computer apparatus to execute a data processing method, wherein the data processing method comprises the steps of: detecting a second interval according to coding order of frames necessary to decode a first interval which is designated by display order of the frames in video data which has been compression-encoded by using an inter-frame compression according to a predictive coding; and forming a file to store the video data in the detected second interval, and the file forming step includes a step of adding information showing the first interval by the frame display order to the file.

According to further another embodiment of the present invention, there is provided a data structure including at least: video data in a second interval according to coding order of frames necessary to decode a first interval which is designated by display order of the frames in video data which has been compression-encoded by using an inter-frame compression according to a predictive coding; and information showing the first interval by the frame display order.

According to further another embodiment of the present invention, there is provided a recording medium in which a file having a data structure has been recorded, wherein the data structure includes at least: video data in a second interval according to coding order of frames necessary to decode a first interval which is designated by display order of the frames in video data which has been compression-encoded by using an inter-frame compression according to a predictive coding; and information showing the first interval by the frame display order.

According to further another embodiment of the present invention, there is provided a reproducing apparatus for reproducing video data which has been compression-encoded by using a frame compression according to a predictive coding and has been recorded in a recording medium, comprising: a reproducing unit reproducing the data from the recording medium; a decoding unit decoding the video data reproduced by the reproducing unit; and an output control unit controlling an output of the video data decoded by the decoding unit on a frame unit basis, wherein a file having a data structure is reproduced by the reproducing unit, the data structure includes at least the video data in a second interval according to coding order of frames necessary to decode a first interval which is designated by display order of the frames in the video data which has been compression-encoded by using an inter-frame compression according to the predictive coding and has been recorded in the recording medium and information showing the first interval by the frame display order, and when the video data included in the reproduced file is decoded, the output control unit controls so as to output the video data from the head frame in the first interval on the basis of the information which is included in the file and shows the first interval by the frame display order.

According to further another embodiment of the present invention, there is provided a reproducing method of reproducing video data which has been compression-encoded by using a frame compression according to a predictive coding and has been recorded in a recording medium, comprising the steps of: reproducing the data from the recording medium; decoding the reproduced video data; and controlling an output of the decoded video data on a frame unit basis, wherein a file having a data structure is reproduced, the data structure includes at least the video data in a second interval according to coding order of frames necessary to decode a first interval which is designated by display order of the frames in the video data which has been compression-encoded by using an inter-frame compression according to the predictive coding and has been recorded in the recording medium and information showing the first interval by the frame display order, and when the video data included in the reproduced file is decoded, in the output control step, control is made so as to output the video data from the head frame in the first interval on the basis of the information which is included in the file and shows the first interval by the frame display order.

According to further another embodiment of the present invention, there is provided a reproducing program for allowing a computer apparatus to execute a reproducing method of reproducing video data which has been compression-encoded by using a frame compression according to a predictive coding and has been recorded in a recording medium, wherein the reproducing method comprises the steps of: reproducing the data from the recording medium; decoding the reproduced video data; and controlling an output of the decoded video data on a frame unit basis, a file having a data structure is reproduced, the data structure includes at least the video data in a second interval according to coding order of frames necessary to decode a first interval which is designated by display order of the frames in the video data which has been compression-encoded by using an inter-frame compression according to the predictive coding and has been recorded in the recording medium and information showing the first interval by the frame display order, and when the video data included in the reproduced file is decoded, in the output control step, control is made so as to output the video data from the head frame in the first interval on the basis of the information which is included in the file and shows the first interval by the frame display order.

According to the embodiments of the present invention, the second interval according to the coding order of the frames necessary to decode the first interval which is designated by the frame display order in the video data which has been compression-encoded by using the inter-frame compression according to the predictive coding is detected. The file to store the video data in the detected second interval is formed. The information showing the first interval by the frame display order is added to the file. Therefore, such a file that the process to reproduce only the first interval of the video data stored in the file can be easily executed by the transfer destination side or the like can be formed.

According to the embodiments of the present invention, at least the video data in the second interval according to the coding order of the frames necessary to decode the first interval which is designated by the frame display order in the video data which has been compression-encoded by using the inter-frame compression according to the predictive coding and the information showing the first interval by the frame display order are included in the data structure. Therefore, according to the data including such a data structure, the process to reproduce only the first interval of the video data included in the data can be easily executed. If the data having such a data structure is stored into the file, the process to reproduce only the first interval can be easily executed even by the transfer destination side or the like of the file.

According to the embodiments of the present invention, the file having the data structure has been recorded in the recording medium, in which the data structure includes at least: the video data in the second interval according to the coding order of the frames necessary to decode the first interval which is designated by the frame display order in the video data which has been compression-encoded by using the inter-frame compression according to the predictive coding; and the information showing the first interval by the frame display order. Therefore, when the file recorded in the recording medium is reproduced, the process to reproduce only the first interval of the video data stored in the file can be easily executed.

According to the embodiments of the present invention, when reproducing the file which has been recorded in the recording medium and has the data structure including at least the video data in the second interval according to the coding order of the frames necessary to decode the first interval which is designated by the frame display order in the video data which has been compression-encoded by using the inter-frame compression according to the predictive coding and the information showing the first interval by the frame display order and when decoding the video data included in the reproduced file, the control is made so as to output the video data from the head frame in the first interval on the basis of the information which is included in the file and shows the first interval by the frame display order. Therefore, even in such a case where the file is transferred from the outside, the process to reproduce only the first interval of the video data stored in the file can be easily executed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1A to 1C are schematic diagrams for explaining a decoding process in the case of the long GOP;

FIGS. 2A to 2C are schematic diagrams for explaining an MXF format;

FIGS. 3A to 3C are schematic diagrams for explaining the MXF format;

FIGS. 4A to 4D are schematic diagrams for explaining the MXF format;

FIGS. 5A to 5C are schematic diagrams for explaining the MXF format;

FIG. 6 is a schematic diagram showing a bit assignment of an example of a flag in an index entry;

FIG. 14 is a schematic diagram showing a data layout of an example in a disc-shaped recording medium;

FIGS. 15A to 15D are schematic diagrams for explaining a clip;

DETAILED DESCRIPTION OF THE PREFERRED EMBODIMENTS

Figure 7:
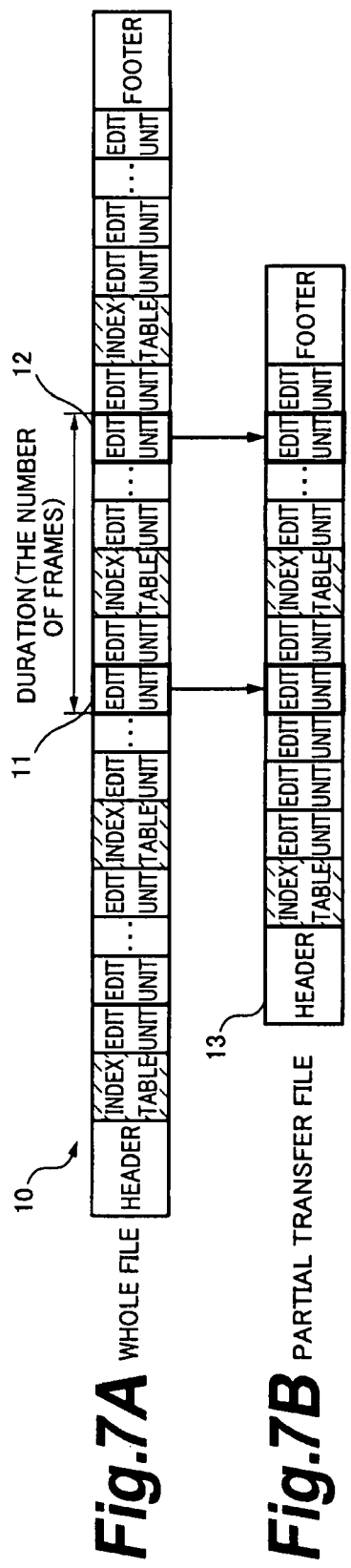
FIGS. 7A and 7B are schematic diagrams for explaining a partial transferring process of a file according to an embodiment of the invention.

An embodiment of the invention will be described hereinbelow with reference to the drawings. First, a data structure which can be applied to the embodiment of the invention will be described. FIGS. 2A to 5C show mapping structures for an MPEG (Moving Picture Experts Group) stream of a data format called MXF (Material Exchange Format) which can be applied to the embodiment of the invention. The MXF is a file format standard specified in SMPTE (Society of Motion Picture and Television Engineers). The mapping structure for the MPEG stream, which will be explained hereinafter, has been specified in SMPTE-381M. A file which has a structure according to the regulations of the MXF mentioned above and is applied to the embodiment of the invention is called an MXF file hereinbelow.

As shown in FIG. 2A, the whole MXF file is constructed by a file header (File Header), a file body (File Body), and a file footer (File Footer). The file header is constructed by a header partition pack (HPP) and header metadata (Header Metadata). Data to specify the header, a format of data which is arranged in the file body, information showing a file format, and the like are stored into the header partition pack. For example, metadata of a file unit such as information regarding the time and date of creation of the file and information regarding the data arranged in the file body is stored in the header metadata.

The file body is constructed by a body partition pack (BPP), an edit unit (Edit Unit), and an index table (Index Table). Data to specify the body and the like are stored into the body partition pack. Zero or one index table and one or a plurality of edit units are arranged in an area partitioned by the body partition pack. Data of each frame is stored into the edit unit. Information of each edit unit included in the one-precedent area partitioned by the body partition pack is stored into the index table. Details of the edit unit and the index table will be described hereinafter.

The file footer is constructed by a footer partition pack, an index table, and a random index pack. Since there are no portions which are directly concerned with the invention with respect to the file footer, their explanation is omitted here for the purpose of avoiding complexity.

The whole edit unit of each area partitioned by the body partition pack is called an essence container (Essence Container) (refer to the left side in FIG. 2B) That is, the essence container is a set of video and audio data which is actually reproduced in the MXF file.

The whole portion of each of index table segments (Index Table Segments) which are arranged in the file body and the file footer is called an index table (refer to the right side in FIG. 2B). For example, when the system reads the MXF file, by searching and reading out each index table segment and constructing the index table, the information regarding all of the edit units in the MXF file can be obtained with reference to the constructed index table.

FIG. 2C shows a structure of an example of the index table. In FIG. 2C, a numeral shown in a lower portion of each area indicates a size of relevant area by the number of bytes. The index table is encoded by using a KLV (Key-Length-Value) code. In the KLV code, a "K (Key)" portion is an identifier showing a KLV-encoded data item according to SMPTE 335M/RP210A and has a data length of 16 bytes. An "L (Length)" portion has a data length of, for example, 4 bytes and the data length subsequent to the "L" portion is shown by a byte unit. A "V (Value)" portion is an area where the data main body is stored. A structure constructed by a "T (Local Tag)" portion, the "L (Length)" portion, and a data portion of a variable length each having a data length of 2 bytes can be further defined in the "V" portion.

An index table segment key (Index Table Segment Key) having a data length of 16 bytes is arranged at the head of the index table. In this example, subsequently, the "L" portion having a data length of 4 bytes is arranged, the "T" portion and the "L" portion each having a data length of 2 bytes are arranged, and thereafter, an instance ID (Instance ID) having a data length of 16 bytes is arranged. The order of the respective items in the index table is not limited to such an example. The instance ID is described by using a UUID (Universally Unique ID). Subsequently, the "T" portion and the "L" portion are arranged. After that, an index edit rate (Index Edit Rate) having a data length of 8 bytes is arranged. The index edit rate indicates which one of 29.97 Hz, 25 Hz, and 23.98 Hz a frame rate of the video data is.

Subsequently, the "T" portion and the "L" portion are arranged. After that, an index start position (Index Start Position) having a data length of 8 bytes is arranged. The head number of the edit unit which is managed by the index table is shown in the index start position. Subsequently, the "T" portion and the "L" portion are arranged. After that, an index duration (Index Duration) having a data length of 8 bytes is arranged. In the index duration, a length of whole edit unit which is managed by the index table is shown by the number of edit units.

Subsequently, the "T" portion and the "L" portion are arranged. After that, an edit unit byte count (Edit Unit Byte Count) having a data length of 4 bytes is arranged. In the edit unit byte count, the data length of the video frame is described if the video frame has a fixed length, while a value "0" is described if the video frame has a variable length. Subsequently, the "T" portion and the "L" portion are arranged. After that, an index SID having a data length of 4 bytes is arranged. Furthermore, a body SID is arranged after the "T" portion and the "L" portion. A value of each of the index SID and the body SID is set to a fixed value of "1" or "2". Subsequently, the "T" portion and the "L" portion are arranged. After that, a slice count (Slice Count) having a data length of 1 byte is arranged. The slice count shows a slice (which will be explained hereinafter) which is managed by the index table.

Subsequently, the "T" portion and the "L" portion are arranged. After that, a delta entry array (Delta Entry Array) having a data length of 44 bytes is arranged. Subsequently, the "T" portion and the "L" portion are further arranged. After that, an index entry array (Index Entry Array) of a variable length is arranged. The delta entry array and the index entry array will be explained hereinafter.

The "K" portion, the "L" portion, and a filler portion are arranged after the index entry array. In this example, by arranging the filler portion, the size of index table is aligned to a predetermined value.

FIGS. 3A to 3C show an example of the edit unit and the delta entry array. Since the index table shown in FIG. 3C is the same as that in FIG. 2C, its description is omitted. The edit unit is constructed by data of one frame and includes system data, MPEG video data, and audio data (for example, AES) as shown in the example in FIG. 3A. Each of the system data and the audio data of a plurality of channels (in this example, four channels) has a fixed length (CBE: Constant Bytes per Element). The video data has a variable length (VBE: Variable Bytes per Element). In one edit unit, a slice (Slice) is made every VBE data. In the example in FIG. 3A, since the video data has the variable length, the slice is made at the rear edge of the video data, the former half is assumed to be "Slice 0", and the latter half is assumed to be "Slice 1". The number of sliced data is described in the foregoing slice count.

As shown in the example in FIG. 3B, offset information in the edit unit of each data included in the edit unit is described in the delta entry array. In the delta entry array, the information of each data included in the edit unit is called a delta entry (Delta Entry). The delta entry array is a set of delta entries of the data included in the edit unit. The number of delta entries (Number of Delta Entries) having a data length of 4 bytes is arranged in the head of the delta entry. In the example in which the edit unit is constructed by the total six data of one system data, one video data, and four audio data, six delta entries are included in the delta entry array. A value "6" is described in the number of delta entries. A delta entry length (Length of Delta Entries) in which a data length of the delta entry is shown by the number of bytes is arranged after the number of delta entries.

Each of the delta entries is constructed by a pos table index (Pos Table Index), a slice (Slice), and an element delta (Element Delta). In the pos table index, coding order differs from the display order of the data in each element. When a difference between the display order and the coding order is determined by a temporal offset value in the delta entry array, the pos table index is set to a value "−1". When the display order of the data and the coding order coincide, the pos table index is set to a value "0". If the display order and the coding order differ every portion of the data of the element, a difference of each portion is described in the pos table in the delta entry array. A value of the pos table index is set to an index value (positive value) in the table which describes the differences. Since the pos table index is not typically concerned with the invention, further explanation is omitted here. The slice indicates a slice position of the corresponding data in the edit unit. The element delta shows an offset from the head of the slice.

FIGS. 4A to 4D show an example of the index entry array and the essence container stream. FIGS. 4A and 4B show an example of a data stream by the essence container, that is, an essence container stream (Essence Container Stream). The edit units of the MXF file are extracted and arranged in order and a stream is formed.

FIG. 4C shows an example of the index entry array. The number of index entries (Number of Index Entries) shows the number of index entries included in the index entry array. Since each of the index entries corresponds to the edit unit, in other words, the number of index entries indicates the number of edit units which are managed by this index table. An index entry length (Length of Index Entries) in which a data length of the index entry is shown by the number of bytes is arranged after the number of index entries.

Each of the index entries is constructed by a temporal offset (Temporal Offset), a key-frame offset (Key-Frame Offset), flags (Flags), a stream offset (Stream Offset), and a slice offset (slice Offset). The temporal offset has a data length of one byte and shows information of rearrangement of the display order and the coding order. The key-frame offset has a data length of one byte and shows information of frames which are used for decoding. The flag has a data length of one byte and shows a frame type. Details of the temporal offset, the key-frame offset, and the flag will be described herein after. The stream offset has a data length of 8 bytes and shows an offset for the head of the essence container stream of the whole MXF file. The slice offset has a data length of 4 bytes and shows an offset of Slice 1 in the corresponding edit unit.

The foregoing temporal offset, the key-frame offset, and the flag will be described in more detail with reference to FIGS. 5A to 5C. FIG. 5A shows the display order (Display Order) of the frames and FIG. 5B shows the coding order (Coding Order) of the frames by a unit of the "edit unit". In FIGS. 5A and 5B, the display order and the coding order corresponding to a certain index table are shown by sequentially adding the numbers to them while the head order is set to #0. FIG. 5C shows the temporal offset, the key-frame offset, and the flag in correspondence to the display order in FIG. 5A and the coding order in FIG. 5B.

"I", "P", and "B" shown in FIGS. 5A and 5B indicate the I picture, P picture, and B picture, respectively. In the display order, the frame obtained by decoding the I picture is described like a frame "I". In the coding order, the edit unit in which the I picture has been stored is described like an edit unit "I".

In the example in FIGS. 5A to 5C, it is assumed for simplicity of explanation that one GOP is constructed by one I picture, one P picture, and four B pictures. The GOP constructed by the former-half six pictures is assumed to be a closed GOP and the GOP constructed by the latter-half six pictures is assumed to be an open GOP. The display order and the coding order corresponding to a certain index table are shown by sequentially adding the numbers to them from #0.

As already described in the related art, in the closed GOP, since the decoding is completed in the GOP, in the case of the construction shown in FIGS. 5A to 5C, the frame "B" #0 and the frame "B" #1 in the display order are decoded only from the frame "I" #2. The frame "B" #3 and the frame "B" #4 are decoded by using the frame "I" #2 and the frame "P" #5.

In the open GOP, the decoding can be performed by using the pictures of other GOPs. In the example shown in FIGS. 5A to 5C, the frame "B" #6 and the frame "B" #7 are decoded by using the frame "I" #8 and the frame "P" #5 included in the one-precedent GOP. In this instance, since the frame "P" #5 is decoded by using the frame "I" #2, in order to decode the frame "B" #6 and the frame "B" #7, three frames of the frame "I" #8, frame "P" #5, and frame "I" #2 are necessary.

The temporal offset shows how many frames in the coding order have been rearranged for the display order. For example, since the frame "I" #2 locating at the third place in the display order corresponds to the edit unit "I" #0 locating at the first place in the coding order, the value of the temporal offset is equal to "−2". Since the frame "B" #6 locating at the seventh place in the display order corresponds to the edit unit "B" #7 locating at the eighth place in the coding order, the value of the temporal offset is equal to "+1".

The key-frame offset indicates the number of edit units which is necessary to be traced in order to decode the video data included in the corresponding edit unit. For example, since the edit unit #0 including the frame "I" #2 can decode the frame "I" #2 by itself, a value of the key-frame offset is equal to "0". As for the edit unit #4 including the frame "B" #3, the frame "I" #2 and the frame "P" #5 are necessary in order to decode the frame "B" #3 and it is necessary to trace to the edit unit #0 including the frame "I" #2. Therefore, the value of the key-frame offset of the edit unit #4 is equal to "−4".

Further, in the case of the open GOP, the head frame "B" is decoded by using the frames of the one-precedent GOP. For example, the frame "B" #7 is decoded by using the frame "I" #8 and the frame "P" #5 of the one-precedent GOP. The frame "P" #5 is further decoded by using the frame "I" #2. Therefore, as for the edit unit #8 including the frame "B" #7, it is necessary to trace to the edit unit #0 including the frame "I" #2. Therefore, the value of the key-frame offset of the edit unit #8 is equal to "−8".

The flag has a data length of one byte, that is, 8 bits and predetermined information regarding the edit unit corresponding to such a flag is allocated to each of 8 bits. FIG. 6 shows a bit assignment of an example of the flag. Among the eight bits of the 0th to 7th bits, from the upper side, the 7th bit indicates whether or not the corresponding edit unit includes the random-accessible frame. The random-accessible frame is a frame corresponding to a sequence header (Sequence_Header) and belonging to the closed GOP. The sequence header typically corresponds to the frame "I". The 6th bit indicates whether or not the corresponding edit unit includes the sequence header.

The 5th bit indicates whether or not the frame included in the corresponding edit unit is decoded by using the forward prediction (Forward Prediction). The 4th bit indicates whether or not the frame included in the corresponding edit unit is decoded by using the backward prediction (Backward Prediction). The 3rd bit indicates whether or not the offset of the frame included in the corresponding edit unit is out of the range (Offset out of range). The 2nd bit is a bit which is not used in the mapping of the MPEG.

The picture type of the frame included in the corresponding edit unit is shown by using two bits of the 1st bit and the 0th bit. When the two bits of the 1st and 0th bits are equal to "00", the frame by the I picture is shown; The frame by the P picture is shown by "10". The frame by the B picture is shown by "11".

As will be understood from FIGS. 5A to 5C, when the frame #n as display order is designated, by referring to the temporal offset in the nth index entry in the index entry array, the coding order corresponding to the designated frame #n can be known. Further, by referring to the key-frame offset in the index entry corresponding to the coding order corresponding to the designated frame #n, the coding order of the head picture necessary to decode the picture of the coding order can be known.

That is, by using the temporal offset and the key-frame offset, when the frame #n is designated in the display order, the head picture necessary to decode the designated frame #n, that is, the position of the edit unit in the file can be known by an index table unit. Therefore, when the system accesses the file, first by preliminarily reading all of the index tables in the file, accessing performance to an arbitrary frame in the file is improved.

The invention is not limited to such a construction but the system can also sequentially read the index tables from the head in the file in accessing order to the file. In this case, as compared with the example in which all of the index tables in the file are read, it is difficult to expect high accessing performance to the portion where the index table is not read.

The embodiment of the invention will now be described. In the invention, when the partial transfer in which the video data is extracted from the file so that the frame interval designated for the video data stored in the file can be reproduced and the extracted video data is transferred as anew file is executed, the new file is formed while also including the frames necessary to decode the designated frame interval (not displayed). At the same time, the index table is rewritten according to the video data included in the new file. When the video data which is partially transferred is stored into the new file, a display start frame whose display is started and the number of frames from the display start frame are described in the header metadata included in the file header.

Figure 8:
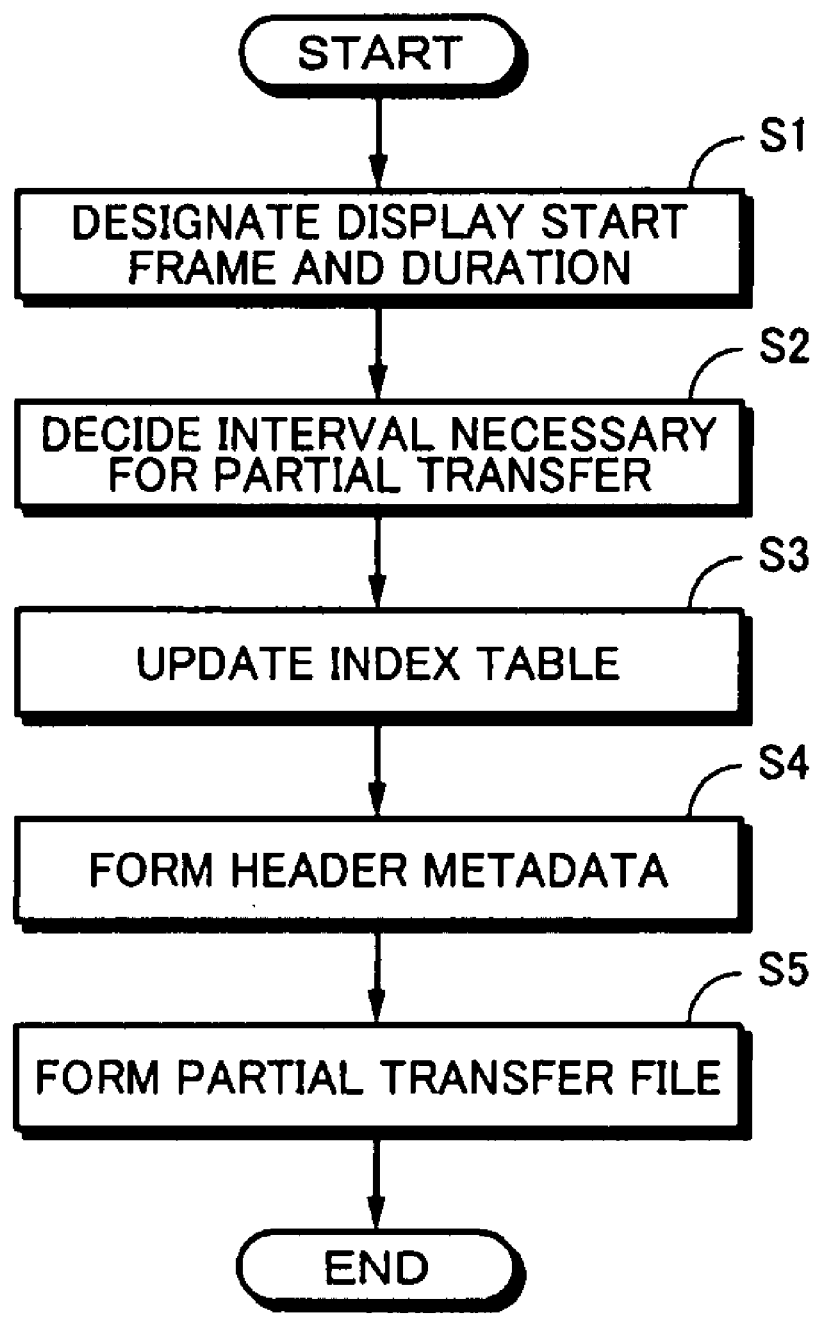
FIG. 8 is a flowchart schematically showing processes of an example for forming a partial transfer file.

First, a process for extracting the video data which is partially transferred from the file will be described. The partial transferring process of the file according to the embodiment of the invention will be schematically explained with reference to FIGS. 7A, 7B, and 8. A case of partially transferring the file so that the frames of the designated number from the head frame in the display order are displayed for a file 10 shown in an example in FIG. 7A is considered. FIG. 8 is a flowchart schematically showing processes of an example for, forming the partial transfer file.

The number of frames showing a length of display which is started from the display start frame is called a duration (Duration). The frame interval which is designated by the display start frame and the duration is called a designation display interval.

In step S1, a display start frame 11 and the duration for the display start frame 11 are designated to the file 10 shown in FIG. 7A, thereby setting the designation display interval. The frame which is subsequent to the display start frame 11 by the number of frames designated by the duration becomes a display end frame 12. When the designation display interval is set, an interval necessary to perform the partial transfer is decided in next step S2.

FIG. 7B shows the example of the partial transfer file which is formed by designating the designation display interval for the file 10 shown in FIG. 7A. For the designation display interval, all of the edit units including the frames (pictures) necessary to decode the frames in the designation display interval are included in the partial transfer file. For example, if the designated head frame 11 is a frame by the B picture or the P picture, the time-precedent frame is necessary in order to decode such a frame. In this case, it is necessary that the edit unit including the picture which is time-precedent to the picture corresponding to the designated head frame 11 is included in the partial transfer file. Similarly, if the end frame 12 is a frame by the B picture, it is necessary that the edit unit including the picture which is time-subsequent to the picture corresponding to such a frame is included in the partial transfer file.

The interval which is precedent to the designation display interval and is constructed by the edit units including the pictures which are used to decode the frame in the designation display interval is called a GOP precharge interval. The interval which is subsequent to the designation display interval and is constructed by the edit units including the pictures which are used to decode the frame in the designation display interval is called a GOP overrun interval. In the embodiment of the invention, the partial transfer file is formed while including the GOP precharge interval and the GOP overrun interval for the designation display interval.

When the edit unit to be transferred by the partial transfer file is determined as mentioned above, the index table is updated according to the decided contents in step S3. For example, although details will be described hereinafter, the stream offset in the information of each edit unit in the index entry array in the index table is rewritten. The index start position and the index duration in the index table are also rewritten as necessary. Further, in next step S4, the designated head frame 11 and the values of the duration in the partial transfer file are described as header metadata into a header 13.

In step S5, the partial transfer file is formed by the partial transfer interval decided in step S2, the index table formed in step S3, and the header metadata formed in step S4.

For example, the video data in the partial transfer interval decided in step S2 is read out of the original file and stored into a predetermined address in the memory. The index table formed in step S3 and the header metadata formed in step S4 are stored into the memory so as to form an image of the partial transfer file together with the video data in the partial transfer interval which has already been stored in the memory.

In the foregoing flowchart of FIG. 8, the order of step S3 and the order of step S4 can be also exchanged. The processes of steps S3 and S4 maybe executed in parallel.

Figure 9:
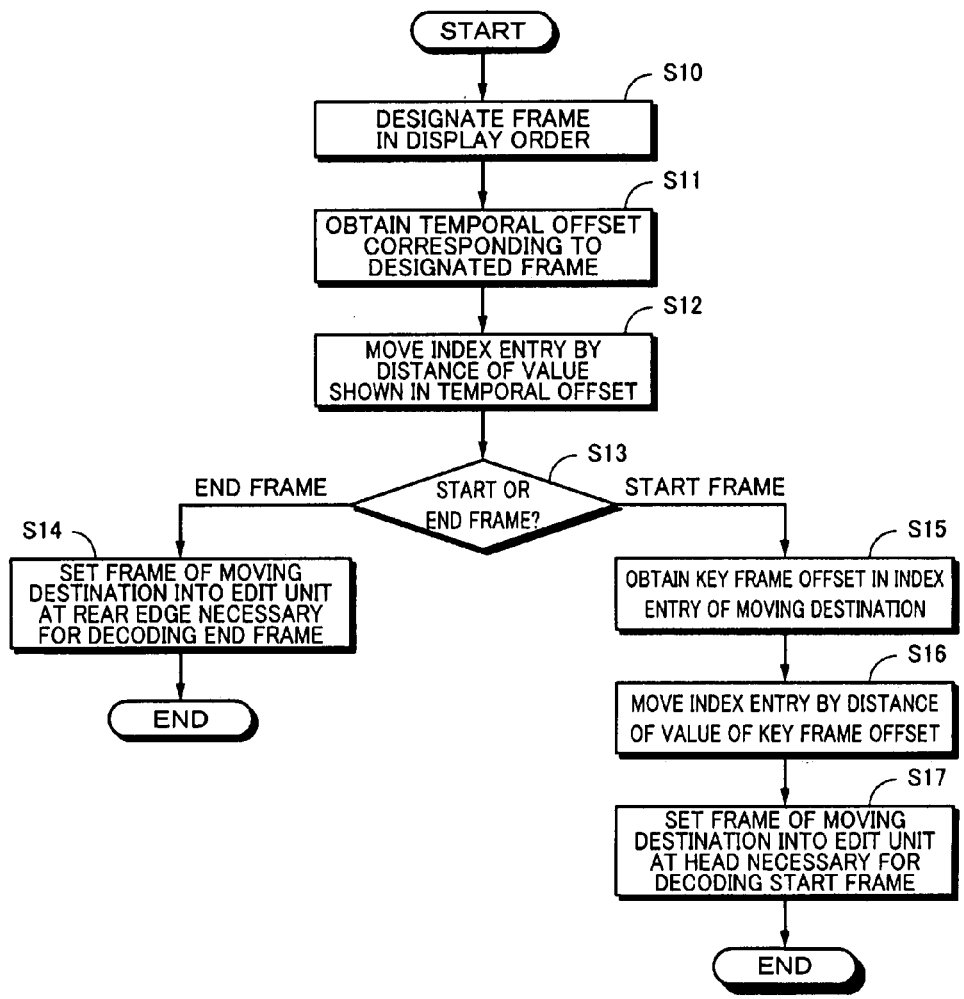
FIG. 9 is a flowchart showing processes of an example for deciding an interval for a partial transfer.

The process of step S2 in the flowchart of FIG. 8 mentioned above will now be described in more detail with reference to a flowchart of FIG. 9. When the frames are designated in the display order in step S10, by referring to the index entry of the coding order corresponding to the display order of the designated frames in the index table, the temporal offset described in such an index entry is obtained in next step S11.

In next step S12, the index entry to be referred to is moved by a distance corresponding to the value shown in the temporal offset obtained in step S11. In the case of obtaining the edit unit necessary to decode the display end frame in the designation display interval (step S13), the edit unit corresponding to the index entry of the moving destination side moved in step S12 becomes the edit unit to be obtained (step S14).

In the case of obtaining the edit unit necessary to decode the display start frame in the designation display interval (step S13), the processing routine advances to step S15 and the key-frame offset is obtained by the index entry of the moving destination side moved in step S12. In next step S16, the index entry to be referred to is moved by a distance corresponding to the value shown in the obtained key-frame offset and the edit unit corresponding to the index entry of the moving destination side is set to the head edit unit necessary to decode the display start frame in the designation display interval designated in step S10 (step S17).

Figure 10:
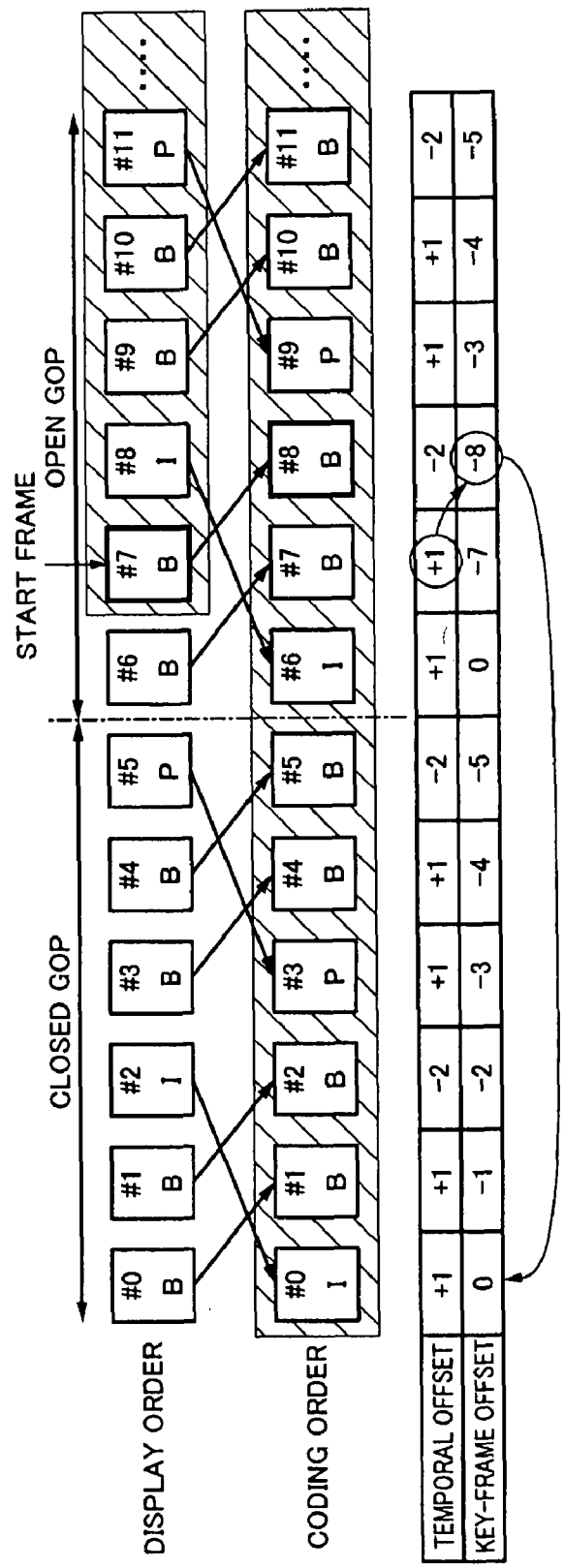
FIG. 10 is a schematic diagram showing an example for obtaining an edit unit which is stored into the partial transfer file with respect to video data having an open GOP structure.
Figure 11:
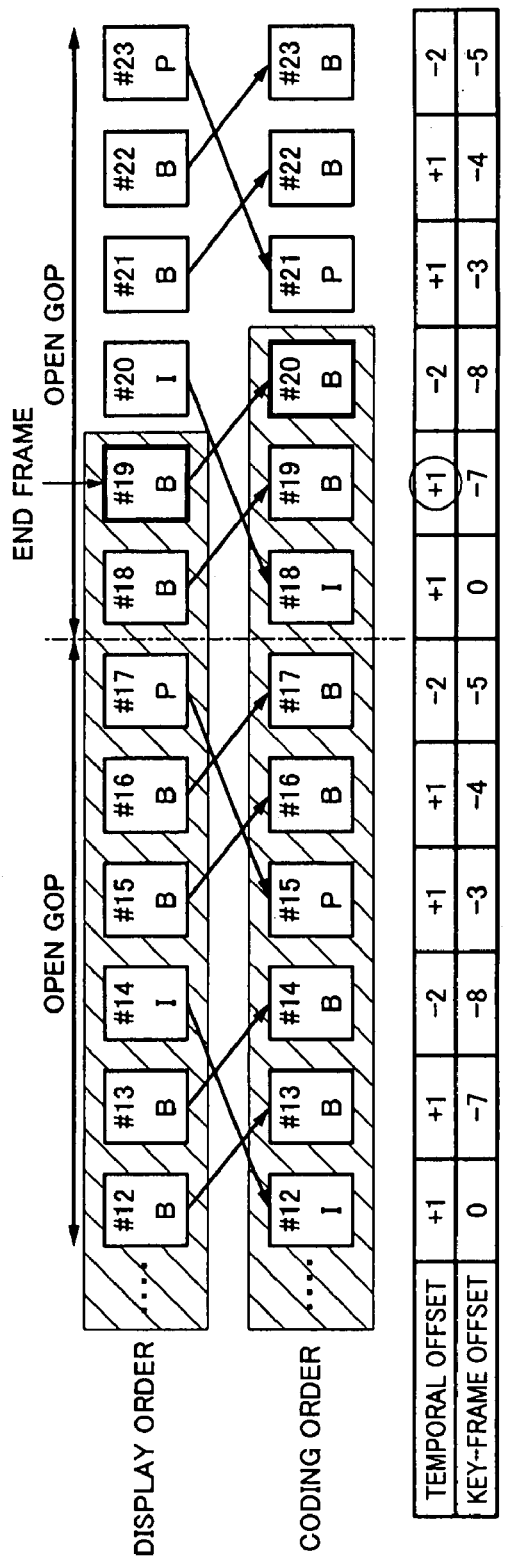
FIG. 11 is a schematic diagram showing an example for obtaining the edit unit which is stored into the partial transfer file with respect to the video data having the open GOP structure.

More specific examples will be described with reference to FIGS. 10 to 13. FIGS. 10 and 11 show the examples for obtaining the edit unit to be stored into the partial transfer file with respect to the video data having the open GOP structure. It is assumed that the display order and the coding order are started from the number #0 and continue from FIG. 10 to FIG. 11.

FIG. 10 shows the example for obtaining the edit unit which is necessary to decode the display start frame in the video data of the open GOP structure. In the example of FIG. 10, the display start frame is designated to the frame "B" #7 included in the GOP of the open GOP structure. As for the frame "B" #7, in the open GOP structure, the frame belonging to the GOP which is one-precedent to the GOP to which its own frame belongs is necessary upon decoding. Even in the open GOP structure, the head GOP in the whole structure certainly has a structure of a closed GOP as shown in FIG. 10.

In the case where the display start frame is designated to the frame "B" #7 included in the GOP of the open GOP structure, the index entry of the coding order #7 corresponding to the display order of the frame "B" #7 is referred to and the value "+1" of the temporal offset is obtained. The index entry is moved by the distance of the temporal offset value "+1". The key-frame offset value "−8" of the index entry corresponding to the coding order #8 is obtained. The edit unit #0 corresponding to the coding order #0 shown in the index entry which has been moved from the index entry corresponding to the coding order #8 by the distance of the key-frame offset "−8" becomes the head edit unit which is necessary to decode the display start frame.

FIG. 11 shows the example for obtaining the edit unit which is necessary to decode the display end frame in the video data of the open GOP structure. In the example of FIG. 11, the display end frame is designated to the frame "B" #19. The index entry of the coding order #18 corresponding to the display order of the frame "B" #19 as an end frame is referred to and the value "+1" of the temporal offset is obtained. The index entry is moved by the distance of the temporal offset value "+1". The edit unit #20 corresponding to the coding order #20 shown in the index entry as a moving destination becomes the edit unit which is necessary to decode the display end frame.

Figure 12:
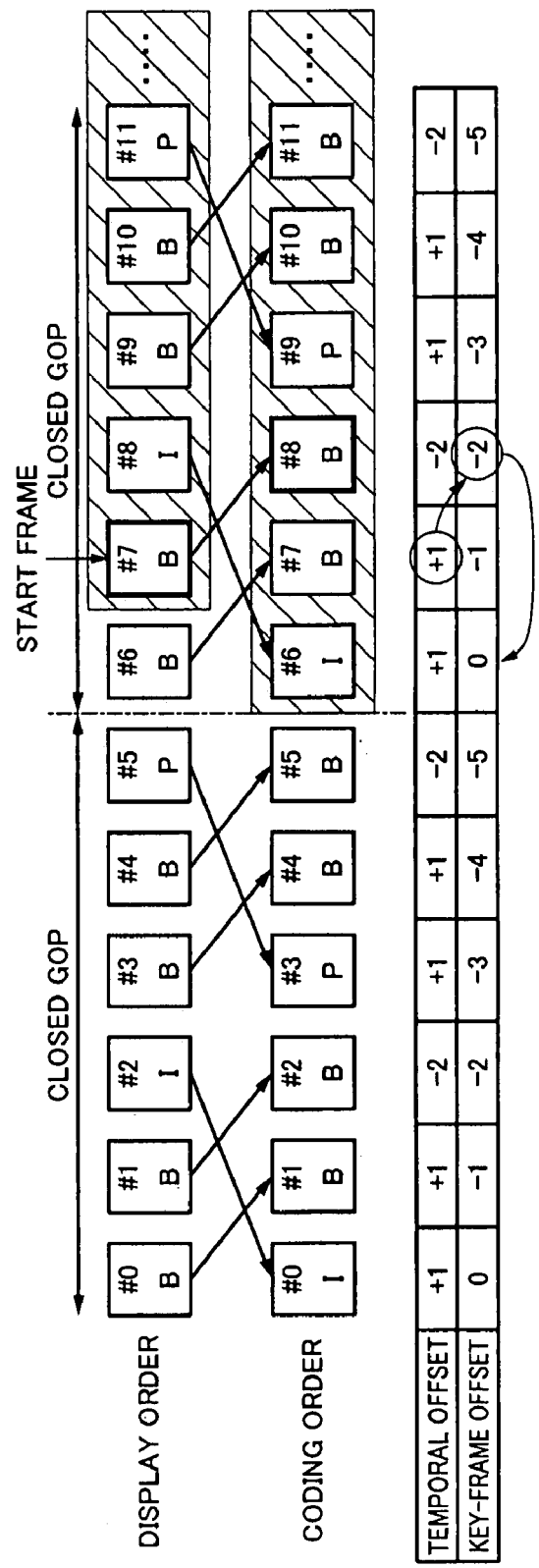
FIG. 12 is a schematic diagram showing an example for obtaining an edit unit which is stored into the partial transfer file with respect to video data having a closed GOP structure.
Figure 13:
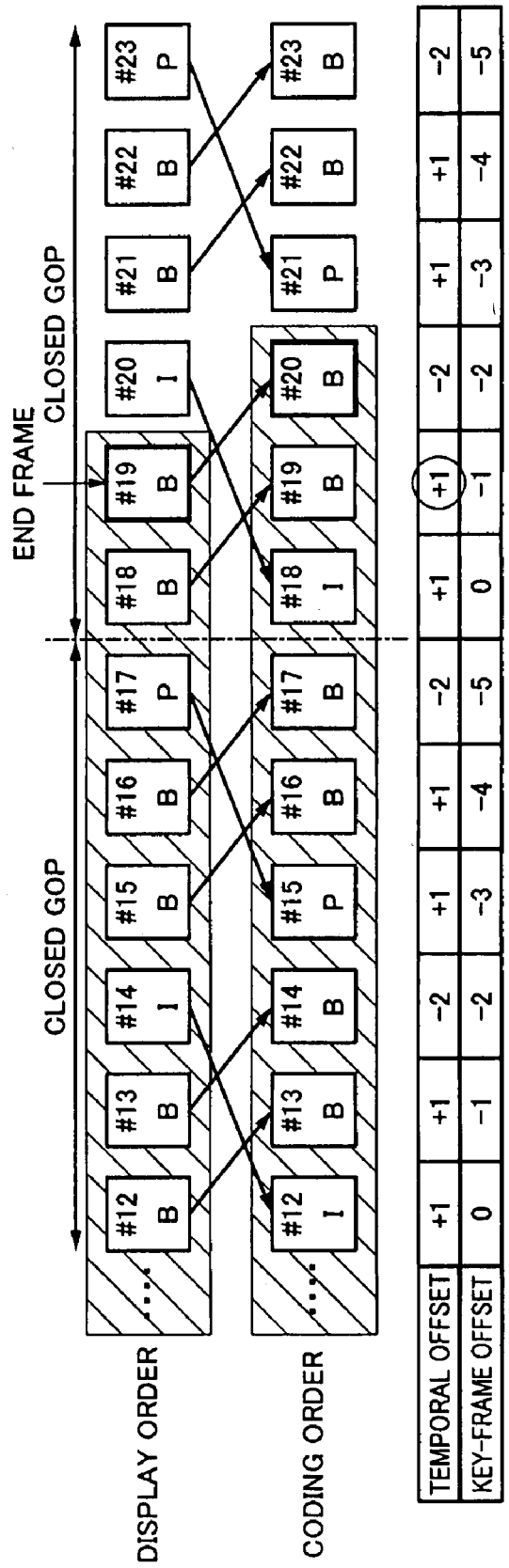
FIG. 13 is a schematic diagram showing an example for obtaining the edit unit which is stored into the partial transfer file with respect to the video data having the closed GOP structure.

FIGS. 12 and 13 show the examples for obtaining the edit unit to be stored into the partial transfer file with respect to the video data having the closed GOP structure. It is assumed that the display order and the coding order are started from the number #0 and continue from FIG. 12 to FIG. 13.

FIG. 12 shows the example for obtaining the edit unit necessary to decode the display start frame in the video data of the closed GOP structure. In the example of FIG. 12, the display start frame is designated to the frame "B" #7. In the case of the closed GOP structure, the frame "B" locating before the first frame "I" in the display order is decoded by the backward reference using only the frame "I" locating after the frame "B" without executing the forward reference.

In the case where the display start frame is designated to the frame "B" #7, the index entry of the coding order corresponding to the display order of the frame "B" #7 is referred to and the value "+1" of the temporal offset is obtained. The index entry is moved by the distance of the temporal offset value "+1". The key-frame offset value "−2" corresponding to the coding order #8 as a moving destination is obtained. The edit unit #6 corresponding to the coding order #6 shown in the index entry which has been moved from the index entry corresponding to the coding order #8 by the distance of the key-frame offset value "−2" becomes the head edit unit necessary to decode the display start frame.

FIG. 13 shows the example for obtaining the edit unit necessary to decode the display end frame in the video data of the closed GOP structure. In the example of FIG. 13, the display end frame is designated to the frame "B" #19. The index entry of the coding order #18 corresponding to the display order of the frame "B" #19 as an end frame is referred to and the value "+1" of the temporal offset is obtained. The index entry is moved by the distance of the temporal offset value "+1". The edit unit #20 corresponding to the coding order #20 shown in the index entry as a moving destination becomes the edit unit necessary to decode the display end frame. As mentioned above, with respect to the display end frames, the same result is obtained in the open GOP structure and the closed GOP structure.

When the edit unit necessary to decode the display start frame and the edit unit necessary to decode the display end frame are obtained as mentioned above, the information of the GOPs to which those edit units belong is obtained, respectively. The information in a range from the GOP to which the edit unit necessary to decode the display start frame belongs to the GOP to which the edit unit necessary to decode the display end frame belongs is extracted from the original file on a GOP unit basis, thereby forming the partial transfer file.

For instance, in the example of FIG. 10 showing the display start frame side in the open GOP structure, assuming that the display start frame is the frame "B" #7 which belongs to the second GOP from the head, as mentioned above, the head edit unit which is necessary to decode is the frame "I" #2 in the one-precedent GOP of the GOP to which the frame "B" #7 belongs. The frame "B" #7 is decoded by using both of the frame "P" #5 decoded by using the frame "I" #2 and the frame "I" #8 of the GOP to which the frame "B" #7 belongs. Therefore, the frame by the B picture in the one-precedent GOP of the GOP to which the frame "B" #7 belongs is actually unnecessary.

In the embodiment, the pictures including such an unnecessary B picture are stored on a GOP unit basis on the display start frame side.

In the example of FIG. 11 showing the display end frame side, for instance, it is assumed that the display end frame is designated to the frame "I" #20 which can be decoded only by the corresponding I picture. In this case, according to the processes of the flowchart of FIG. 9 mentioned above, the edit unit necessary to decode the display end frame is the edit unit #18 corresponding to the coding order #18 as an edit unit in which the data of the corresponding I picture is stored. However, since the frame "B" #18 and the frame "B" #19 in the same GOP exist before the frame "I" #20 in the display order, it is necessary to also decode the frame "B" #18 and the frame "B" #19 (the 19th and 20th places in the coding order) locating after the frame "I" #20 (the 18th place in the coding order). This is true of the case where the display end frame is the frame "P" by the P picture which does not need the backward reference.

In the embodiment, since the data is extracted on a GOP unit basis and form the partial transfer file, the B picture whose order is exchanged to the order of the I picture or the P picture in the display order and the coding order on the display end frame side can be also stored into the partial transfer file.

The invention is not limited to the above construction but it is also possible to extract the video data from the original file on a picture unit basis and to form the partial transfer file by the extracted pictures. In this case, it is necessary to properly execute the removal of the edit unit in which the foregoing B picture that is necessary on the display start frame side has been stored, the addition of the edit unit in which the B picture whose order is exchanged to the order of the I picture or the P picture in the display order and the coding order on the display end frame side has been stored, or the like.

An updating process of the index table in step S3 in the foregoing flowchart of FIG. 8 will now be described in more detail. In each index entry in the index entry array in the index table, since the flag has a value peculiar to 1 each edit unit, it is unchanged. Since the partial transfer file is formed without executing the decoding and re-encoding processes and there are no changes in the data of the picture which is stored into the edit unit, the slice offset is also unchanged. The temporal offset and the key-frame offset are unchanged in the case of storing the data into the partial transfer file on a GOP unit basis.

The stream offset is updated every index entry in accordance with the structure of the essence container stream which is stored in the partial transfer file. That is, the offset of each edit unit is obtained by using the head of the GOP which is subjected to the partial transfer as a reference and is set to the value of the new stream offset.

In the partial transfer file, when the number of edit units existing before the index table is changed as compared with the original file, the index start position in the index table is updated according to the number of edit units.

For example, the edit unit number is changed in the case where the rear side including the area which is managed by a certain index table is extracted from the original file and stored into the partial transfer file and the area before the area which is managed by the index table is not included in the partial transfer file. In such a case, the index start position is updated according to the changed edit unit number.

When the number of edit units which are managed by the index table is changed, the index duration is updated according to the number of edit units. For example, in the case where the edit unit is extracted from the halfway of the area which is managed by a certain index table and stored into the partial transfer file, the number of edit units which are managed by the index table changes. In such a case, the index duration in the index table is updated so as to indicate the number of edit units which are managed by the index table.

The updating process of the header metadata in step S4 in the flowchart of FIG. 8 mentioned above will now be described in more detail. As mentioned above, the display start frame and the duration are described as header metadata into the header 13. The display start frame is described by the display order in the partial transfer file.

An effect which is obtained by describing the display start frame and the duration into the header metadata will now be explained with reference to FIG. 10 mentioned above. As already described, in the example of FIG. 10, in the open GOP structure, when the display start frame is designated to the head frame "B" #7 of the GOP in the display order, the frame "I" #2 of the GOP which is one-precedent to the GOP to which the frame "B" #7 belongs is set to the head frame necessary to decode the display start frame "B" #7. In the coding order, the frame "I" #2 corresponds to the head edit unit of the GOP. Since the data is stored into the partial transfer file on a GOP unit basis, in this example, the data is stored into the partial transfer file from the GOP which is one-precedent to the GOP to which the display start frame "B" #7 belongs.

In the related art, the information for such a designation display interval is not described in the header 13. Therefore, when the partial transfer file formed as mentioned above is reproduced, the reproducing system has to display from the head frame which can be displayed and, if it is intended to display from the display start frame, it is necessary to newly search for the head of the display start frame. For instance, in the example of FIG. 10, the reproduction is started from the head frame "B" #0 in the display order of the GOP which is one-precedent to the GOP to which the display start frame "B" #7 belongs.

According to the embodiment of the invention, by previously reading the header 13 when reproducing the partial transfer file, the reproducing system can know the interval to be displayed in the partial transfer file on the basis of the information of the display start frame and the duration described in the header metadata. Thus, when reproducing the partial transfer file, the reproduction can be directly started from the display start frame without reproducing the frames before the display start frame and the display only in the designated interval can be easily performed.

A system which can be applied to the embodiment of the invention will now be described more specifically. First, a recording medium which can be applied to the embodiment of the invention will be described. FIG. 14 shows a data layout of an example in a disc-shaped recording medium. The data layout of an example shown in FIG. 14 is a general data layout in the random-accessible disc-shaped recording medium such as recordable optical disk or hard disk. A logical address space is an area where arbitrary data can be recorded and reproduced.

In the embodiment, the recording medium is assumed to be an optical disc. The recording medium which can be applied to the embodiment is not limited to the optical disc. That is, the embodiment can be also applied to another random-accessible recording medium such as hard disc drive or semiconductor memory. The foregoing MXF file is recorded to, for example, such a recording medium and provided. The partial transfer file constructed by the data extracted from the MXF file on the basis of the display start frame and the duration can be recorded onto such a recording medium.

File systems FS are arranged at the front and rear edges of a logic address. Arbitrary data is recorded into a logic address space in a predetermined format generally called a file. The data on the recording medium is fundamentally managed on a file unit basis. Management information of the file is recorded into the file system FS. In a file system layer of a system control unit (which will be explained hereinafter) of the recording and reproducing apparatus, many various kinds of data can be managed on one recording medium by referring to and operating the information of the file system. For example, a UDF (Universal Disk Format) is used for the file system FS and the file is managed on a unit basis of 2 kB (kilobytes).

An alternating area is arranged out of the logic address space. The alternating area is an area which can be alternately used if a part of the recording medium is difficult to be physically read out or written due to a defect. For example, if a defective area is recognized at the time of the access to the recording medium (particularly, access upon recording), generally, an alternating process is executed and the address of the defective area is moved into the alternating area.

A using situation of the alternating area is stored as a defect list into a predetermined area and used by a lower layer of a drive control unit or the system control unit of the recording and reproducing apparatus. That is, in the lower layer of the drive control unit or the system control unit, which will be explained hereinafter, when accessing the recording medium, by referring to the defect list, an access to a proper area can be performed even when the alternating process has been executed. By such a mechanism of the alternating area, an upper application can record and reproduce the data onto/from the recording medium without considering the presence or absence, the position, or the like of the defective recording area on the recording medium.

In the case of the disc-shaped recording medium, the alternating area is often arranged on the innermost rim side or the outermost rim side of the disc. When rotation control of the disc is made by zone control for changing a rotational speed in the disc radial direction step by step, there is also a case where the alternating area is provided every zone. If the recording medium is not a disc-shaped recording medium but is a semiconductor memory or the like, the alternating area is often arranged on the side of the smallest physical address or the side of the largest physical address.

In an application which handles audio data and video data (hereinbelow, collectively referred to as AV data), a set of data as a unit for which it is necessary to execute the reproduction in which the continuous synchronous reproduction, that is, the real-time reproduction has been guaranteed is called a "clip". For example, a set of data which is obtained in a range from the start of the photographing by a video camera to the end thereof is called a "clip". The substance of the clip is constructed by one or a plurality of files. In the invention, the clip is constructed by a plurality of files. The details of the clip will be described hereinafter.

For example, an NRT (Non Real Time) area where an arbitrary file other than the clip can be recorded is arranged to the head side in the logic address space. The clips are sequentially stored into the areas next to the NRT area. The clips are arranged to positions while avoiding the defect position on an optical disc 1 so that the foregoing alternating process is not executed. A header (H) and a footer (F) are added to each clip. In this example, the header and the footer are collectively arranged on the rear edge side of the clip.

In the following description, it is assumed that the clip which is first recorded onto the optical disc 1 is set to a clip #1 and, after that, the clip number increases like clip #2, clip #3, . . . hereinafter.

In the logic address space, an area where no data is recorded and an area which is at present unnecessary although the data was recorded in the past are managed as vacant areas in the file system FS. On the basis of the vacant areas, a recording area is allocated to a file which is newly recorded onto the recording medium. Management information of the file is added to the file system FS.

When a recordable optical disc is used as a recording medium, in the invention, the clip is recorded onto the recording medium by an annual ring structure. The annual ring structure will be described with reference to FIGS. 15A to 15D and 16. FIG. 15A shows an example in which one clip 50 is shown on a time line. In this example, the clip 50 is constructed by seven files of video data 51, audio data 52A to 52D, auxiliary AV data 53, and real-time metadata 54.

The video data 51 is video data obtained by compression-encoding video data of a base band at a high bit rate such as 50 Mbps (megabits/second). For example, the MPEG2 (Moving Picture Experts Group 2) system is used as a compression encoding system. Audio data of the base band is used for each of the audio data 52A, 52B, 52C, and 52D and each of them is audio data of two channels. The invention is not limited to such data but audio data obtained by compression-encoding audio data of the base band at the high bit rate can be also used for each of the audio data 52A, 52B, 52C, and 52D. The video data 51 and the audio data 52A to 52D are data as a target of the actual broadcasting or edition and called data of a main line system.

The auxiliary AV data 53 is data obtained by compression-encoding the video data and the audio data of the base band at a bit rate lower than that of the video data and the audio data of the main line system and multiplexing them. For example, the MPEG4 system is used as a compression encoding system. The AV data of the main line system is compression-encoded at a low bit rate of, for example, a few Mbps and formed. The auxiliary AV data 53 is data which is used as a proxy of the data of the main line system in order to execute the high-speed search reproduction and also referred to as proxy (Proxy) data.

The metadata is upper data regarding certain data and functions as an index for expressing the contents of various kinds of data. The metadata includes two kinds of metadata: real-time metadata 54 which is generated along a time sequence of the AV data of the main line system mentioned above; and non-time-sequential metadata which is generated for a predetermined interval, for example, every scene in the AV data of the main line system. The non-time-sequential metadata is recorded into, for example, the NRT area described in conjunction with FIG. 14.

As shown in an example in FIG. 15B, the clip 50 is divided by using a predetermined reproducing time (for example, two seconds) as a reference and recorded as an annual ring structure onto the optical disc. As shown in an example in FIG. 15C, each of the video data 51, audio data 52A to 52D, auxiliary AV data 53, and real-time metadata (RM) 54 are divided into a predetermined reproducing time unit having a data size of one or more circumferences of a track so that are producing time zone corresponds and they are sequentially arranged every divided reproducing time unit and recorded. That is, each data constructing the clip 50 is interleaved on a predetermined reproducing time unit basis according to the annual ring structure and recorded onto the optical disc.

The data forming the annual ring is called annual ring data. The annual ring data has a data amount which is integer times as large as the minimum recording unit in the disc. The annual rings are recorded so that a boundary between them coincides with a block boundary of the recording unit of the disc.

Figure 16:
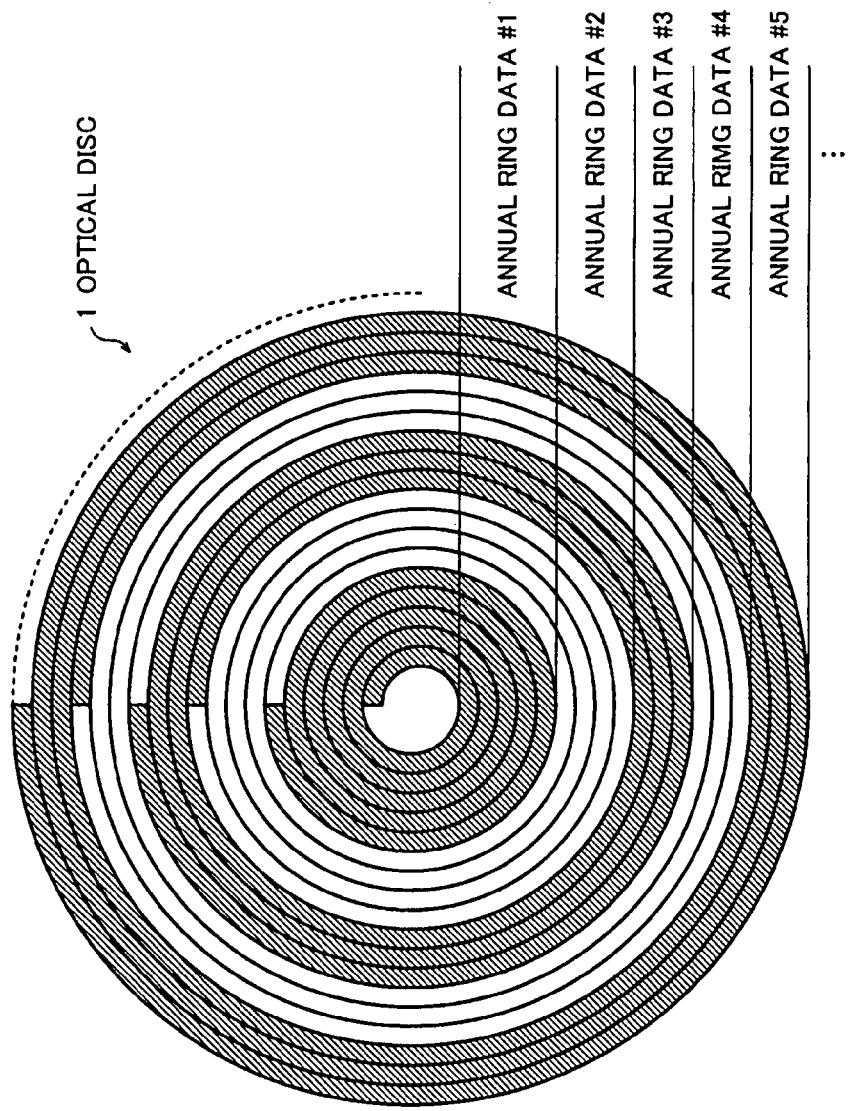
FIG. 16 is a schematic diagram showing a state of an example in which annual ring data has been formed to an optical disc.

FIG. 16 shows a state of an example in which the annual ring data has been formed to the optical disc 1. For example, as described with reference to FIG. 15B, the annual ring data #1, #2, #3, . . . in which one clip has been divided on a predetermined reproducing time unit basis are continuously recorded from the inner rim side to the outer rim side of the optical disc 1. That is, the data is arranged so that the reproduction time sequence continues from the inner rim side to the outer rim side of the optical disc 1. Although not shown, in the example of FIG. 16, the NRT area is arranged on the further inner rim side of the head annual ring data #1.

Figures 17A, 17B, 17C, 17D, 17E, 17F:
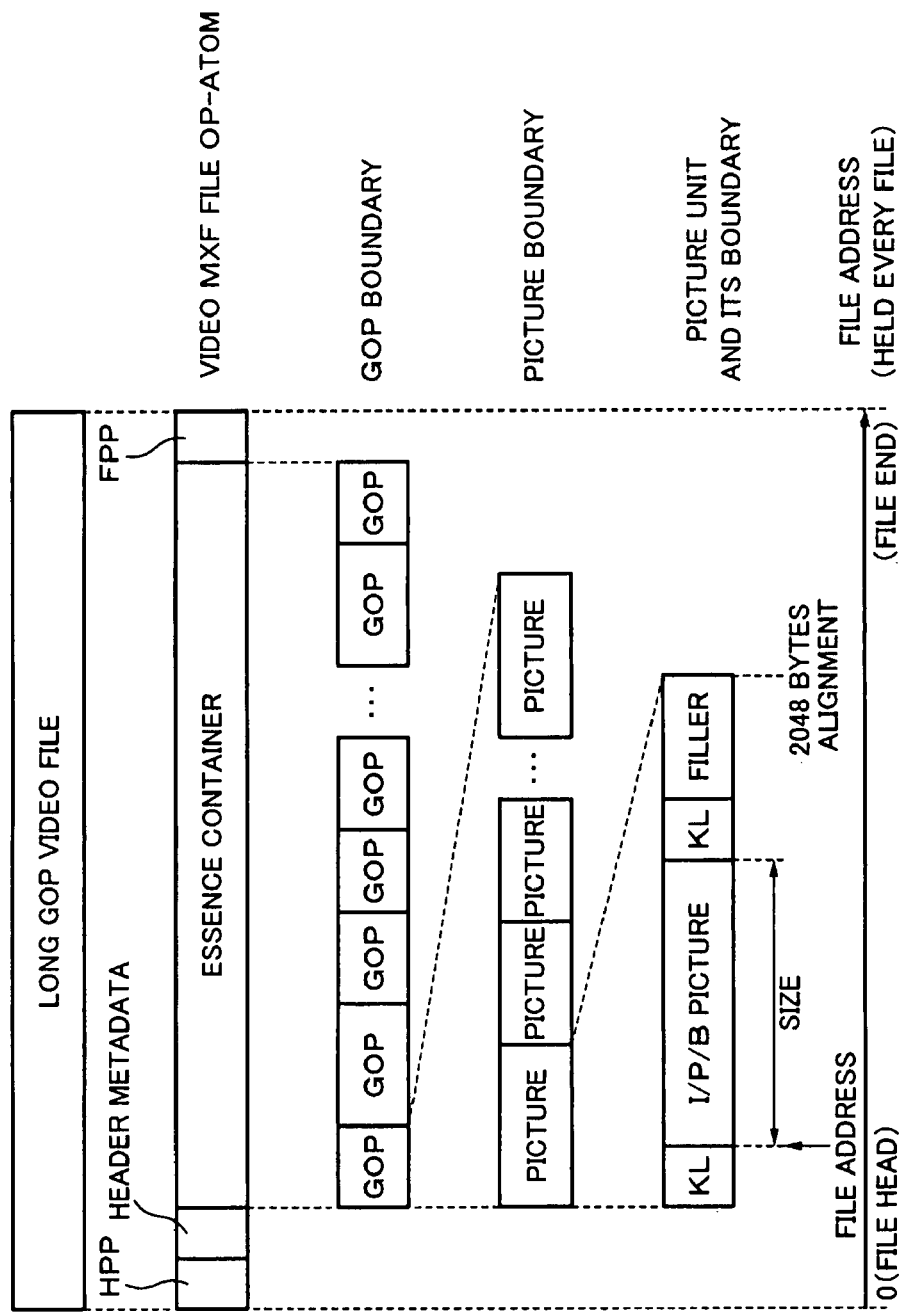
FIGS. 17A to 17F are schematic diagrams showing a data structure of an example in the long GOP of the MPEG2.

FIGS. 17A to 17F show a data structure of an example in the long GOP of the MPEG2. For example, as shown in FIG. 17A, one long GOP file is constructed from one clip. As shown in FIG. 17B, the long GOP file has a structure of the video MXF file which has already been described with reference to FIGS. 2A to 2C. The header 13 is constructed by arranging a header partition pack (HPP) and header metadata from the head. An essence container in which a main body of the video data is stored is arranged in a file body after the header. A footer partition pack (FPP) is arranged at the end of the file, thereby constructing a file footer (not shown).

As shown in FIG. 17C, the essence container has a construction in which the GOPs are arranged. As shown in FIG. 17D, the contents of each GOP are a set of pictures. As shown in FIG. 17E, the contents of one picture are as follows: KL (Key, length) information is arranged at the head; a main body of the I, P, or B picture is subsequently arranged; and the KL information is further arranged. A filler is arranged at the end of the picture as necessary, thereby aligning the end on a 2048-byte unit basis.

In such a construction, in the long GOP of the MPEG2, an information amount of each picture, that is, a value of a size of the I, P, or B picture shown in FIG. 17E is unspecified. Therefore, for example, in the case where it is intended to start the reproduction from a certain frame in the long GOP video file, the head position of the picture corresponding to such a frame in the long GOP video file is difficult to be designated by the byte position or the like.

Therefore, a file address (refer to FIG. 17F) shown by a byte unit from the head position of the long GOP video file is used as a reference. With respect to each picture included in the long GOP video file, a file address, a size, a picture type (I, P, or B picture), and information showing whether or not the picture is the head picture of the GOP are prepared as picture pointer information. The picture pointer information is prepared every long GOP video file.

The filler which is arranged at the end of the picture and shown in FIG. 17E is adjusted in such a manner that the file address of the boundary between the pictures is equal to a multiple of a predetermined number of bytes, for example, 2048 bytes. For instance, if the boundary between the pictures is adjusted by using the filler so as to coincide with a boundary of the minimum access unit such as a sector of the optical disc 1, the access for each picture becomes easy, so that it is preferable.

Figure 18:
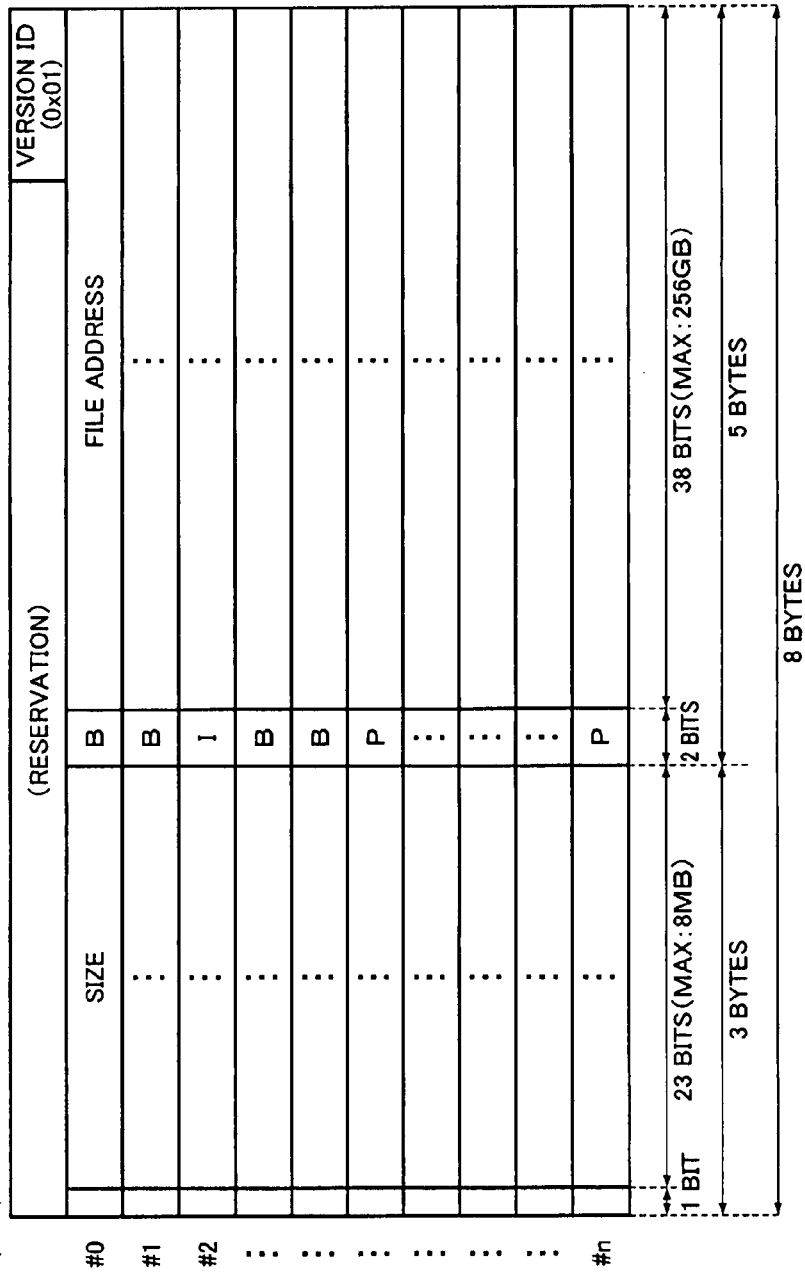
FIG. 18 is a schematic diagram showing a more specific example of a picture pointer table in which picture pointer information is described.

FIG. 18 shows a more specific example of a picture pointer table in which the picture pointer information is described. In this example, the data is described in the picture pointer table on an 8-byte unit basis. A reservation area and version information of this picture pointer table are stored into head 8 bytes. After that, 8 bytes are allocated to one frame, that is, to one picture. The 8-byte information of the number as many as the number of pictures included in the long GOP video file is arranged. The respective pictures are arranged in order of the display frames.

The data of each picture will be described. The head one bit is a flag showing whether or not the picture is the head picture of the GOP. For example, now assuming a case where a plurality of I pictures exist in one GOP, the boundary between the GOPs is difficult to be specified only by using the positions of the I pictures. When considering a system in which a sequence header is provided for each GOP, if the boundary between the GOPs is difficult to be specified, the position of a sequence header (Sequence Header) specified in the MPEG2 is difficult to be known and there is a risk that the system enters the state where there is no sequence header at the head of the stream which is inputted to the decoder. Such a state can be avoided by allowing each picture to have a flag showing whether or not the picture is the head picture of the GOP. Upon reproduction, the stream is inputted to the decoder on the basis of such a flag.

Size information of the picture shown in FIG. 17E is stored into next 23 bits. By assuring 23 bits as size information, it is possible to cope with the data size of up to 8 MB (megabytes) and to also cope with 422@HL of an MPEG profile.

A picture type is shown by next 2 bits. Information about a referring direction is also shown with respect to the B picture. More specifically speaking, the picture types are described, for example, as follows.

00: I picture
10: P picture
01: B picture which is reconstructed only from the future frame by performing the backward reference. For example, it is a head B picture of the long GOP video file in the case of the open GOP or a head B picture of each GOP in the case of the closed GOP.
11: B picture which is reconstructed by referring to the forward and backward frames.

A file address in the long GOP video file of the relevant picture is shown by next 38 bits. By allocating 38 bits to the file address, it is possible to cope with the optical disc 1 in which up to eight recording layers each having a recording capacity of 27 GB have been formed.

The picture pointer table is recorded as a picture pointer file into, for example, the NRT area of the recording medium together with the non-time-sequential metadata. When the optical disc 1 is loaded into the system, the non-time-sequential metadata and the picture pointer file recorded in the NRT area are read out by the system and the optical disc 1 is mounted to the system. The read-out non-time-sequential metadata and picture pointer file are held into, for example, a memory which the control unit of the system has. By referring to the picture pointer table held in the memory, the control unit of the system can access an arbitrary picture in the clip recorded in the optical disc 1.

Figure 19:
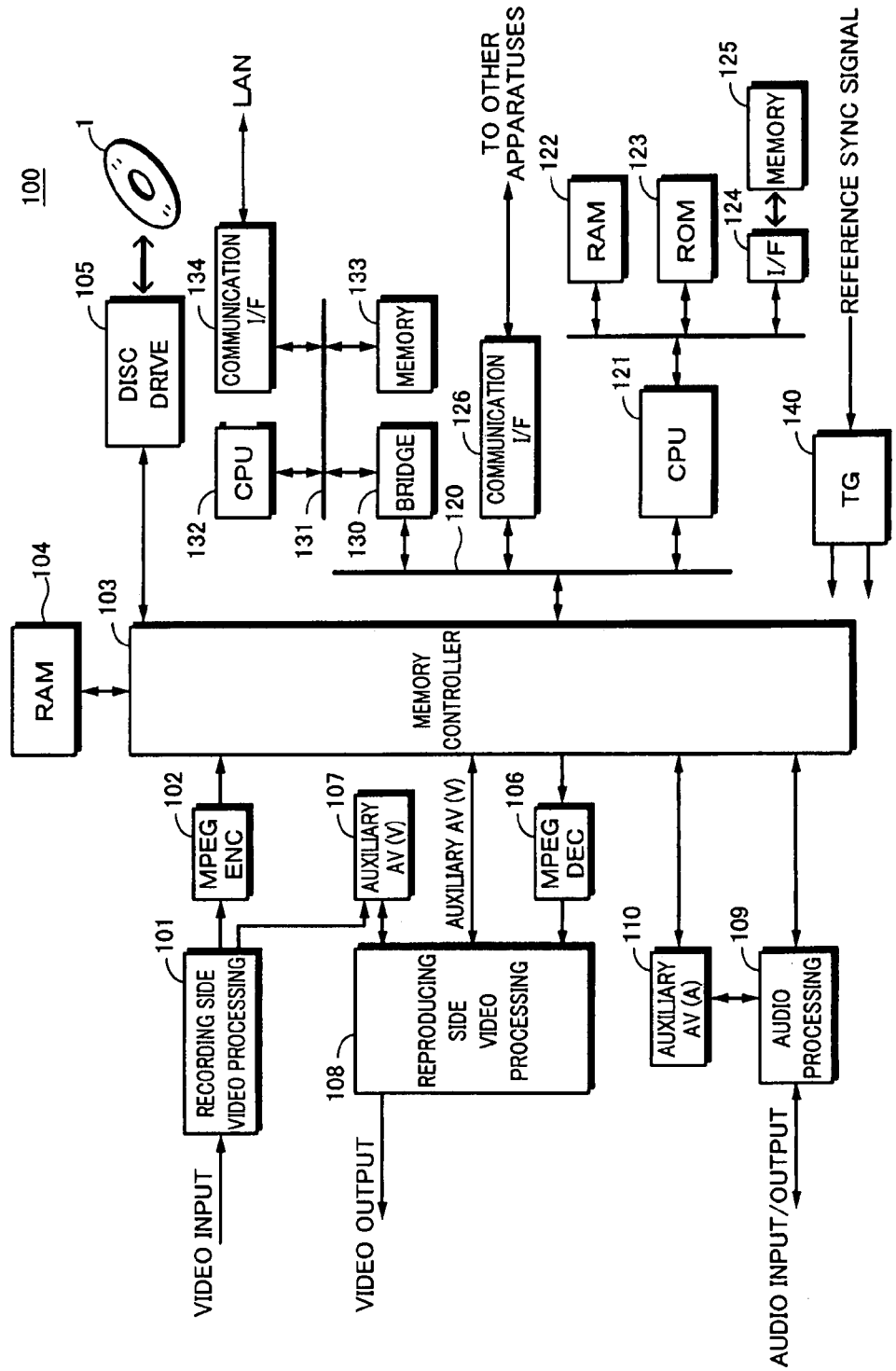
FIG. 19 is a block diagram showing a construction of an example of a recording and reproducing apparatus which can be applied to an embodiment of the invention.

A recording and reproducing apparatus which can be applied to the embodiment of the invention will now be described. FIG. 19 shows a construction of an example of a recording and reproducing apparatus 100 which can be applied to the embodiment of the invention. The recording and reproducing apparatus 100 can use the foregoing optical disc 1 as a recording medium.

A recording side video signal processing unit 101 executes a predetermined signal process to an inputted digital video signal of the base band. An MPEG encoder 102 executes a compression encoding process according to the regulations of the MPEG2 to the digital video signal supplied from the recording side video signal processing unit 101 and outputs an MPEG ES (MPEG elementary stream). That is, the MPEG encoder 102 executes an intra-frame compression to the supplied digital video signal by a DCT (Discrete Cosine Transform) and executes an inter-frame compression by using the predictive coding. Further, the MPEG encoder 102 executes a variable-length coding to the intra-frame compressed and inter-frame compressed data.

A RAM (Random Access Memory) 104 is connected to a memory controller 103. The memory controller 103 controls buffering of the video data regarding the recording and reproduction to the RAM 104. The memory controller 103 also controls transmission and reception of data and commands among: each unit for executing the video process of the recording side mentioned above; a disc drive unit 105, which will be explained hereinafter; a bus 120 to which a CPU (Central Processing Unit) 121 for making whole control is connected; each unit for executing the video process of the reproducing side; each unit for executing the audio process; and the like.

The RAM 104 is constructed by, for example, an SDRAM (Synchronous Dynamic RAM) and can temporarily store the video data, audio data, and other data of one to a plurality of annual rings by, for example, an annual ring image as a recording format of the optical disc 1. The memory controller 103 can made access control to the RAM 104 by DMA (Direct Memory Access) control without using the CPU 121, which will be explained hereinafter.

Although details will be explained hereinafter, the disc drive unit 105 records the data to the loaded optical disc 1 and reproduces the data recorded on the optical disc 1. The disc drive unit 105 is connected to the memory controller 103 by a predetermined interface such as an ATA (AT Attachment) and can access a predetermined address on the optical disc 1 on the basis of a command or address information supplied through the interface.

An MPEG decoder 106 decodes the video data which was supplied from the memory controller 103 and has been compression-encoded by the compression encoding system according to the regulations of the MPEG2. The MPEG decoder 106 has a frame buffer (not shown) which can accumulate a plurality of frames obtained after the decoding. The MPEG decoder 106 stores the decoded frames into the frame buffer. The MPEG decoder 106 decodes the forward-reference and/or backward-reference pictures by using the frames stored in the frame buffer and controls output timing of the frames on the basis of a predetermined output control command.

A reproducing side video signal processing unit 108 executes a predetermined signal process to the digital video signal of the base band which has been decoded by the MPEG decoder 106 and outputs the signal to the outside. An auxiliary AV (V) unit 107 for executing a process of the video data side in the auxiliary AV data is connected to the reproducing side video signal processing unit 108.

The auxiliary AV (V) unit 107 executes the process to the video data portion of the auxiliary AV data. For example, the auxiliary AV (V) unit 107 executes a predetermined compression encoding process to the video data supplied from the recording side video signal processing unit 101, thereby forming the video data portion of the auxiliary AV data. The formed video data portion of the auxiliary AV data is supplied to the memory controller 103 through the reproducing side video signal processing unit 108. The auxiliary AV (V) unit 107 also executes a process for decoding the video data portion of the auxiliary AV data supplied from the memory controller 103 through the reproducing side video signal processing unit 108. The digital video signal obtained by decoding the video data portion of the auxiliary AV data is supplied to the reproducing side video signal processing unit 108.

An audio signal processing unit 109 executes inputting/outputting process regarding digital and analog audio signals. For example, the audio signal processing unit 109 executes a predetermined signal process to the inputted digital audio signal and supplies the signal to the memory controller 103 or an auxiliary AV (A) unit 110, which will be explained hereinafter. The audio signal processing unit 109 also executes a predetermined signal process to the digital audio signal supplied from the memory controller 103 or the auxiliary AV (A) unit 110 and outputs the signal to the outside. Further, the audio signal processing unit 109 D/A-converts the analog audio signal supplied from the outside into a digital audio signal and supplies to the memory controller 103 or the auxiliary AV (A) unit 110. Moreover, the audio signal processing unit 109 A/D-converts the digital audio signal supplied from the memory controller 103 or the auxiliary AV (A) unit 110 and outputs as an analog audio signal to the outside.

The auxiliary AV (A) unit 110 executes a process to the audio data portion in the auxiliary AV data. For example, the auxiliary AV (A) unit 110 executes a predetermined compression encoding process to the digital audio signal supplied from the audio signal processing unit 109, thereby forming the audio data portion in the auxiliary AV data. The formed audio data portion in the auxiliary AV data is supplied to the memory controller 103. The auxiliary AV (A) unit 110 decodes the audio data portion in the auxiliary AV data supplied from the memory controller 103 and supplies to the audio signal processing unit 109.

The bus 120 is connected to the memory controller 103. The CPU 121 is connected to the bus 120. A RAM 122, a ROM (Read Only Memory) 123, and an interface (I/F) 124 are further connected to the CPU 121 through the bus. In accordance with a program which has previously been stored in the ROM 123, the CPU 121 controls the whole recording and reproducing apparatus 100 by using the RAM 122 as a work memory. The I/F 124 is used to attach a detachable non-volatile memory 125. Paths for transmitting and receiving commands and data among the CPU 121 and the respective units of the recording and reproducing apparatus 100 are omitted in FIG. 19 in order to avoid complexity.

A communication interface (I/F) 126 is further connected to the bus 120. The communication I/F 126 makes communication between the recording and reproducing apparatus 100 and an external apparatus by a communication system according to the standard of, for example, IEEE (Institute Electrical and Electronics Engineers) 1394. The communication system which is applied to the communication I/F 126 is not limited to IEEE 1394 but may be, for example, a USB (Universal Serial Bus) or the like.

Furthermore, the bus 120 is connected to a bus 131 through a bridge 130. A CPU 132, a memory 133, and a communication interface (I/F) 134 are further connected to the bus 131. The communication I/F 134 is connected to, for example, a LAN (Local Area Network) and makes communication using a TCP/IP (Transmission Control Protocol/Internet Protocol) as a communication protocol. In accordance with a program which has previously been stored in the ROM (not shown), the CPU 132 controls the communication which is made by the communication I/F 134 by using the RAM 133 as a work memory. For example, the CPU 132 can execute the file transfer by the communication I/F 134 by using the FTP (File Transfer Protocol).

For example, assuming that the foregoing ROM 123 is a rewritable ROM such as an EEPROM (Electrically Erasable Programmable Read Only Memory) or the like, the program stored in the ROM 123 can be updated later. Program data for updating is supplied to the recording and reproducing apparatus 100 through, for example, the LAN, received by the communication I/F 134, supplied to the CPU 121 through the bus 131, bridge 130, and bus 120, and written into the ROM 123 under the control of the CPU 121. The program data to update may be supplied from the outside through the communication I/F 126 or can be also stored into the detachable memory 125 and supplied from the memory 125 through the I/F 124.

A reference sync signal to synchronize the video data and the audio data is supplied to a timing generator (TG) 140 from the outside. On the basis of the supplied reference sync signal, the TG 140 forms various timing signals which are used in the recording and reproducing apparatus 100. The formed timing signals are supplied to the corresponding portions (not shown) in the recording and reproducing apparatus 100 in accordance with signal kinds or the like.

The operation to the recording and reproducing apparatus 100 can be executed on the basis of commands which are supplied from the outside through, for example, the communication I/F 126 and the communication I/F 134. That is, the CPU 121 transmits and receives data and commands to/from external apparatuses through the communication I/F 126 and the communication I/F 134, receives operation commands from the external apparatuses, and transmits status information of the recording and reproducing apparatus 100 to the external apparatuses. On the basis of the commands which are transmitted and received to/from the external apparatuses, the CPU 121 properly controls the respective units of the recording and reproducing apparatus 100.

The invention is not limited to such a construction as mentioned above but it is also possible to provide an operating unit for the recording and reproducing apparatus 100 and control the recording and reproducing operations in accordance with the operation to the operating unit.

Figure 20:
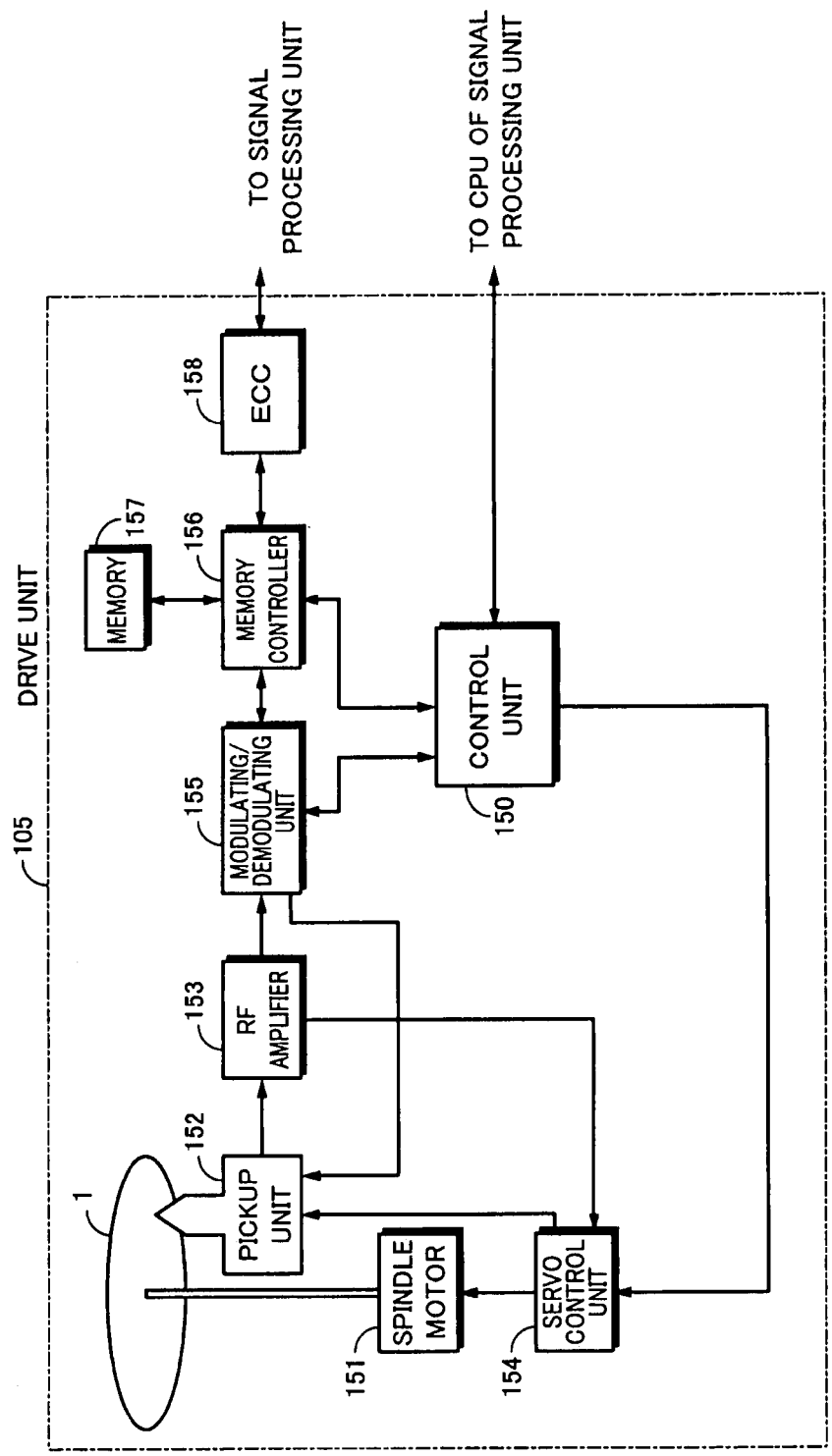
FIG. 20 is a block diagram showing a construction of an example of a disc drive unit.

FIG. 20 shows a construction of an example of the disc drive unit 105 in the recording and reproducing apparatus 100. Upon recording, the recording data supplied from the memory controller 103 is stored into a memory 157 through an ECC (Error Correction Coding) unit 158 and a memory controller 156. The memory controller 156 controls an access to the memory 157 under control of a control unit 150. The control unit 150 is constructed by a micro computer and controls the disc drive unit 105 on the basis of a control signal from the memory controller 156.

An error correction code is formed by the ECC unit 158 every error correction unit for the recording data stored in the memory 157. A product code can be used as an error correction code to the video data and the audio data. The product code is used to perform encoding of an outer code in the vertical direction of a two-dimensional array of the video data or the audio data, perform encoding of an inner code in the lateral direction of the array, and encodes a data symbol twice. A Reed-Solomon code can be used as an outer code and an inner code. A data unit which is completed by the product code is called an ECC block. The ECC block has a size of, for example, 64 kbytes (65536 bytes). The memory controller 156 reads out the ECC block from the memory 157 and supplies as recording data to a modulating/demodulating unit 155. The modulating/demodulating unit 155 modulates the recording data, forms a recording signal, and supplies to a pickup unit 152.

The pickup unit 152 controls an output of a laser beam-on the basis of the recording signal which is supplied from the modulating/demodulating unit 155 and records the recording signal onto the optical disc 1 which is rotated by a spindle motor 151.

The pickup unit 152 photoelectrically converts reflection light from the optical disc 1, forms a current signal, and supplies to an RF (Radio Frequency) amplifier 153. The RF amplifier 153 forms a focusing error signal, a tracking error signal, and a reproduction signal on the basis of the current signal from the pickup unit 152 and supplies the tracking error signal and the focusing error signal to a servo control unit 154. The RF amplifier 153 supplies the reproduction signal to the modulating/demodulating unit 155 upon reproduction.

An irradiating position of the laser beam is controlled to a predetermined position by a servo signal which is supplied from the servo control unit 154 to the pickup unit 152. That is, the servo control unit 154 controls the focusing servo operation and the tracking servo operation. Specifically-speaking, the servo control unit 154 forms a focusing servo signal and a tracking servo signal on the basis of the focusing error signal and the tracking error signal from the RF amplifier 153 and supplies to an actuator (not shown) of the pickup unit 152, respectively. The servo control unit 154 also forms a spindle motor drive signal to drive the spindle motor 151 and controls the spindle servo operation for rotating the optical disc 1 at a predetermined rotational speed.

Further, the servo control unit 154 makes sled control for changing the irradiating position of the laser beam by moving the pickup unit 152 in the radial direction of the optical disc 1. A signal read-out position of the optical disc 1 is set by the control unit 150 on the basis of a control signal which is supplied from the memory controller 156. The position of the pickup unit 152 is controlled so that the signal can be read out from the set read-out position.

The spindle motor 151 rotates the optical disc 1 at a CLV (Constant Linear Velocity) or a CAV (Constant Angular Velocity) on the basis of a spindle motor drive signal from the servo control unit 154. A driving system of the spindle motor 151 can be switched between the CLV and the CAV on the basis of a control signal from the signal processing unit.

Upon reproduction, the pickup unit 152 converges and irradiates the laser beam onto the optical disc 1 and supplies the current signal obtained by photoelectrically converting the reflection light from the optical disc 1 to the RF amplifier 153. The modulating/demodulating unit 155 demodulates the reproduction signal supplied from the RF amplifier 153, forms the reproduction data, and supplies to the memory controller 156. The memory controller 156 writes the supplied reproduction data into the memory 157. The reproduction data is read out of the memory 157 on an ECC block unit basis and supplied to the ECC unit 158.

The ECC unit 158 decodes the error correction code of the supplied reproduction data of the ECC block unit and makes error correction. If an error over the error correcting ability which the error correction code has is detected, an error flag is set to the high level for the error correction unit without making the error correction. The reproduction data outputted from the ECC unit 158 is supplied to the memory controller 156.

In the construction as mentioned above, upon recording, the digital video signal and the digital audio signal are inputted to the recording and reproducing apparatus 100. The digital video signal is subjected to a predetermined signal process by the recording side video signal processing unit 101, compression-encoded by the MPEG encoder 102 by the system according to the standard of the MPEG2, and supplied to the memory controller 103. The digital audio signal is subjected to a predetermined signal process by the audio signal processing unit 109 and supplied to the memory controller 103.

The digital video signal is supplied from the recording side video signal processing unit 101 to the auxiliary AV (V) unit 107. The auxiliary AV (V) unit 107 compression-encodes the supplied digital video signal by the compression encoding system specified in, for example, the MPEG4 so that a bit rate is equal to about a few Mbps, thereby obtaining the video data portion of the auxiliary AV data. The video data portion of the auxiliary AV data is supplied to the memory controller 103. The digital audio signal outputted from the audio signal processing unit 109 is supplied to the auxiliary AV (A) unit 110, compression-encoded by reducing a sampling frequency and the number of quantization bits by using, for example, a decimation and an A-Law encoding, and supplied to the memory controller 103.

The memory controller 103 properly stores the following signals and data into the RAM 104 on the basis of a command from the CPU 121: the digital video signal which has been compression-encoded by the MPEG encoder 102 and supplied; the digital audio signal supplied from the audio signal processing unit 109; and the auxiliary AV data supplied from the auxiliary AV (V) unit 107 and the auxiliary AV (A) unit 110. At this time, the memory controller 103 maps the supplied compression digital video signal, digital audio signal, and auxiliary AV data onto the RAM 104 so as to correspond to the format of the annual rings mentioned above.

When the data is properly stored into the RAM 104, the memory controller 103 reads out the data from the RAM 104 in response to a command from the CPU 121 and supplies the read-out data to the disc drive unit 105 together with a write command. The disc drive unit 105 records the supplied recording data onto the optical disc 1 in the annual ring format in accordance with the write command.

Upon reproduction, when the optical disc 1 is loaded into the disc drive unit 105, the disc drive unit 105 reads out the file system FS on the optical disc 1. The CPU 121 supplies a read command of the file on the optical disc 1 to the disc drive unit 105 through the memory controller 103. In accordance with this command, the disc drive unit 105 accesses the file designated based on the read file system FS. The disc drive unit 105 reads out the data from the optical disc 1 on an annual ring unit basis and supplies to the memory controller 103. The memory controller 103 stores the supplied data into the RAM 104 by an annual ring image.

When the data of a predetermined amount or more is accumulated into the RAM 104, the memory controller 103 reads out the data from the RAM 104. The digital video signal read out of the RAM 104 is supplied from the memory controller 103 to the MPEG decoder 106, the compression code is decoded, and the digital video signal of the base band is derived. The digital video signal is supplied to the reproducing side video signal processing unit 108, properly signal-processed, and outputted.

The audio signal read out of the RAM 104 is also supplied from the memory controller 103 to the audio signal processing unit 109, properly signal-processed, and outputted.

The video data portion in the auxiliary AV data read out of the RAM 104 is supplied from the memory controller 103 to the auxiliary AV (V) unit 107 through the reproducing side video signal processing unit 108. A compression code in the video data portion in the auxiliary AV data is decoded in the auxiliary AV (V) unit 107 and the video data portion is outputted through the reproducing side video signal processing unit 108. The audio data portion in the auxiliary AV data read out of the RAM 104 is supplied from the memory controller 103 to the auxiliary AV (A) unit 110. A compression code in the audio data portion in the auxiliary AV data is decoded in the auxiliary AV (A) unit and the audio data portion is outputted through the audio signal processing unit 109.

When the data is read out of the optical disc 1 and written into the RAM 104, the CPU 121 forms an image of the MXF file on the basis of the data written in the RAM 104 and holds table information such as index table, partition tables, and the like into the RAM 122. For example, the CPU 121 refers to the information in the picture pointer table which has been read out of the optical disc 1 and written into the RAM 104 and forms the table information such as index table, partition tables, and the like.

For example, it is also possible to read out only the data in the NRT area from the optical disc, extract the picture pointer table, and form the table information such as index table, partition tables, and the like from the picture pointer table without reproducing the video data and the like.

The CPU 121 accesses the data stored in the RAM 104 on the basis of the information held in the RAM 122. Thus, the CPU 121 can virtually access the data on the optical disc 1. By constructing as mentioned above, for example, the data recorded onto the optical disc 1 in the annual ring format can be made to be regarded as data of the MXF format by the external apparatuses connected by the communication interfaces 134 and 126.

In the above construction, subsequently, processes for designating the display start frame and the duration for the file recorded on the optical disc 1 and forming the partial transfer file constructed by the frames in the designated interval will now be described. For example, there is considered a case where a partial transfer instruction is received through the communication I/F 134 from the external apparatus connected through the LAN and the formed partial transfer file is transmitted from the communication I/F 134 to this external apparatus through the LAN in response to such an instruction.

When the optical disc 1 is loaded into the disc drive unit 105, the data is read out of the optical disc 1 on an annual ring unit basis and stored into the RAM 104 as mentioned above. On the basis of the information in, for example, the picture pointer table stored in the RAM 104, the CPU 121 forms the index table, header information, each partition information, and the like and forms the image in the MXF format of the data recorded on the optical disc 1 on an annual ring unit basis. The file image in the MXF format is transmitted to the external apparatus connected through the communication I/F 134.

In the external apparatus, a command is issued so as to designate the display start frame and the duration for the target file on the basis of such an image and form such a partial transfer file as to display the image by an amount corresponding to a length of duration from the display start frame. This command is transmitted from the external apparatus to the LAN and received by the communication I/F 134. The received command is sent from the communication I/F 134 to the CPU 121.

In response to the transmitted command, the CPU 121 forms the image of the partial transfer file in accordance with the processes described with reference to the flowchart of FIG. 8. For example, an interval necessary to form the partial transfer file is decided and the corresponding index table and header metadata are formed. The real-time data corresponding to the interval necessary to form the partial transfer file is read out of the optical disc 1, the edit units are formed, and the partial transfer file is formed together with the formed index table and header metadata and the like.

In the case of transferring the partial transfer file to the outside through the communication I/F 134, the CPU 121 instructs the CPU 132 to transmit the partial transfer file from the communication I/F 134, reads out the index table, the header metadata, and the edit units in the predetermined interval which have been stored in the RAM 122 from the RAM 122, and sends them to the CPU 132 through the bus 120, bridge 130, and bus 131. The CPU 132 maps those transmitted data into the file image of the partial transfer file and temporarily stores them into the memory 133. When the CPU 132 instructs the communication I/F 134 to transmit the data stored in the memory 133, the communication I/F 134 properly reads out the data which has been mapped to the image of the partial transfer file and stored in the memory 133 and transmits to the LAN.

The invention is not limited to such a construction that the partial transfer file is transferred from the communication I/F 134 to the outside but, for example, it can be also transferred from the communication I/F 126 to the outside. In this case, a request to form and transfer the partial transfer file is transmitted, for example, from the external apparatus to the communication I/F 126. The index table, the header metadata, and the edit units in the predetermined interval which have been stored in the RAM 122 are read out of the RAM 122 as an image of the partial transfer file by the CPU 121 and directly supplied to the communication I/F 126.

The partial transfer file can be also transferred to the memory 125. In this case, in a manner similar to the case of transmitting the foregoing partial transfer file through the communication I/F 126, the index table, the header metadata, and the edit units in the predetermined interval which have been stored in the RAM 122 are read out of the RAM 122 by the image of the partial transfer file and transferred to the memory 125 through the I/F 124.

On the transfer destination side of the partial transfer file, the transferred partial transfer file can be recorded onto a predetermined recording medium. For example, it is also possible to construct in such a manner that an apparatus similar to the recording and reproducing apparatus 100 is connected to the transfer destination side and the partial transfer file transferred to such an apparatus can be recorded onto the optical disc 1 loaded into the apparatus.

Figure 21:
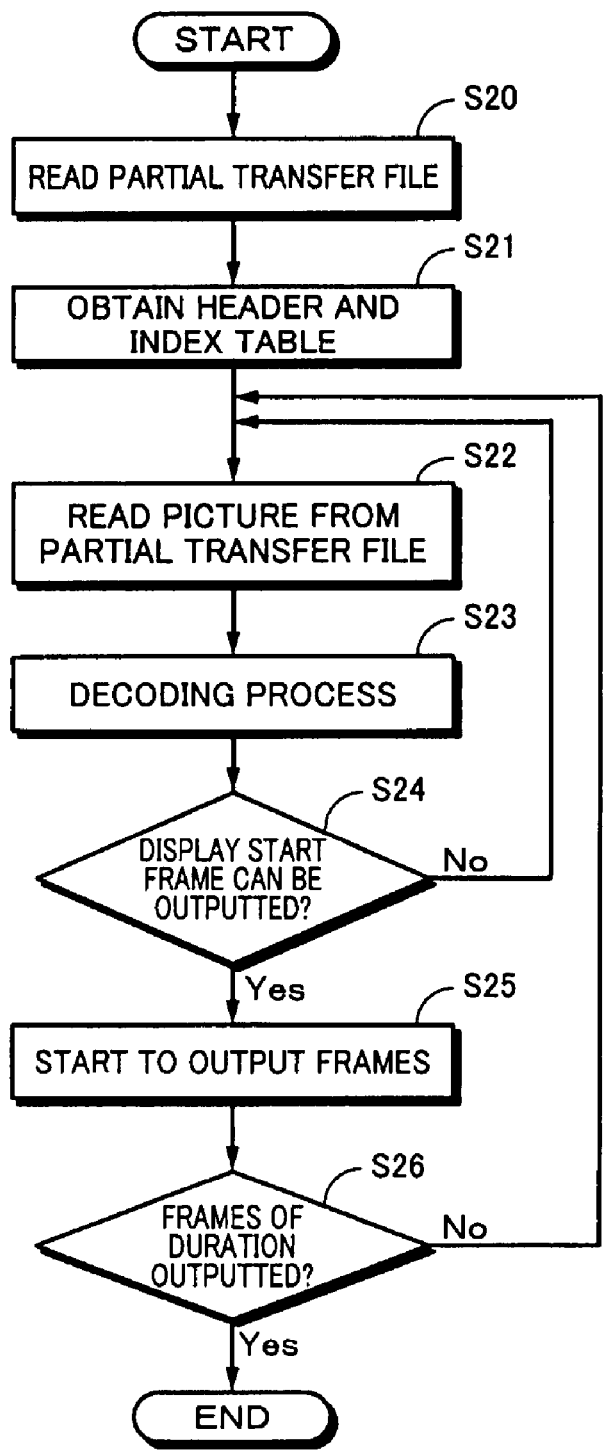
FIG. 21 is a flowchart showing processes of an example for reproducing the partial transfer file.

An example of the processes for reproducing the partial transfer file formed as mentioned above will now be schematically described with reference to a flowchart of FIG. 21. For example, a case where the partial transfer file is recorded onto the optical disc 1, this optical disc 1 is loaded into the recording and reproducing apparatus 100, and the partial transfer file is reproduced will be considered.

When the optical disc 1 is loaded into the disc drive unit 105, the file system of the optical disc 1 is read out by the disc drive unit 105. The read file system is properly obtained by the CPU 121 and stored into, for example, the RAM 122. On the basis of the file system, the CPU 121 can know the information such as file name, address information, and the like which are necessary to access the file with respect to the file recorded on the optical disc 1. The file information can be transmitted to the external apparatuses connected through the communication interfaces 134 and 126. On the basis of the file information, the external apparatuses can request the recording and reproducing apparatus 100 to access the file recorded on the optical disc 1.

For example, a request to reproduce the partial transfer file recorded on the optical disc 1 is transmitted from the external apparatuses connected through the LAN. Such a file reproducing request is received by the communication I/F 134 and properly sent to the CPU 121. In response to the partial transfer file reproducing request, the CPU 121 issues a command to the memory controller 103 to read out the designated partial transfer file recorded on the optical disc 1 (step S20).

It is assumed that the read-out of the data recorded on the optical disc 1 is performed by a method whereby, for example, the disc drive unit 105 is controlled by the memory controller 103 in accordance with a read command issued from the CPU 121 to the memory controller 103. In the following description, to avoid complexity, the reading process of the data recorded on the optical disc 1 is simply described by an expression such as "the CPU 121 reads out the data from the optical disc 1".

The CPU 121 reads out the header 13 and index table of the designated partial transfer file recorded on the optical disc 1 in step S21. The read-out header 13 and index table are sent from the memory controller 103 to the CPU 121 and stored into the RAM 122. On the basis of the header metadata in the header 13, the CPU 121 can know the display start frame and the duration of such a partial transfer file. On the basis of the index table, the CPU 121 can know the data structure and the position of each data which are stored in the partial transfer file.

Subsequently, the CPU 121 starts the reading operation from the head picture in the partial transfer file on the basis of the index table (step S22). Actually, the edit units in the partial transfer file are read out according to the coding order. The read-out pictures are stored into the RAM 104.

A decoding command of the pictures stored in the RAM 104 is issued from the CPU 121 to the MPEG decoder 106 through the memory controller 103. In response to the decoding command issued from the CPU 121, the MPEG decoder 106 reads out the pictures stored in the RAM 104 in the coding order and properly decodes them (step S23). The obtained decoded frames are properly accumulated into a frame buffer built in the MPEG decoder 106.

The CPU 121 monitors a state of the frame buffer built in the MPEG decoder 106 and discriminates whether or not the frame storing state after the decoding in the frame buffer is a state where the display start frame can be outputted on the basis of the display start frame described in the header metadata in the header (step S24). If it is determined that the frame storing state is not the state where the display start frame can be outputted, the processing routine is returned to step S22. The reading process of the pictures from the partial transfer file and the like are executed.

If it is determined that the state in the frame buffer is the state where the display start frame can be outputted, the CPU issues a command to the MPEG decoder 106 to output the frames accumulated in the frame buffer from the display start frame in the display order (step S25). The frames read out of the frame buffer are outputted through the reproducing side video signal processing unit 108.

In next step S26, the CPU 121 discriminates whether or not the frames of the number as many as the number of frames shown in the duration described in the header metadata in the header 13 have been outputted. If it is determined that the output of the frames of the number shown in the duration has been completed, the series of reproduction of the partial transfer file is finished. If it is determined that the output of the frames of the number shown in the duration is not completed, the processing routine is returned to step S22. The processes such as reading of the pictures, decoding, and the like are sequentially executed.

Although the case where the partial transfer file according to the embodiment of the invention has been recorded onto the optical disc 1 and the partial transfer file is reproduced from the optical disc 1 has been described here, the invention is not limited to such an example. That is, the above reproducing method can be also applied to such a case where the partial transfer file which was formed by the recording and reproducing apparatus 100 and has been transferred through the communication interfaces 134 and 126 is received and stored into the memory.

Although the case where the recording and reproducing apparatus 100 is dedicated hardware for reproducing the video data recorded on the optical disc 1 has been described, the invention is not limited to such an example. For example, a general-purpose computer apparatus (not shown) such as a personal computer can be also used as a recording and reproducing apparatus 100. In such a case, the functions of the recording and reproducing apparatus 100 can be realized by programs installed in the computer apparatus. In this instance, the decoding process of the video data can be executed in the CPU by software processes, or exclusive hardware can be also installed in the computer apparatus.

Although the explanation has been made above on the assumption that the invention is applied to the case where the optical disc is used as a recording medium and the clip has been recorded by the annual ring structure, the invention is not limited to such an example. For instance, the recording format on the recording medium is not limited to the annual ring structure but may be another format. The recording medium is not limited to the optical disc but a hard disc drive or a semiconductor memory may be used.

Further, although the explanation has been made above on the assumption that the invention can be applied to the MXF format, the invention is not limited to such an example. That is, the invention can be also applied to another format so long as it is a file format having a portion such as a head portion in which attribute information regarding the file can be described and which is read out separately from a main body portion of the file at the time of access of the file and in which it is possible to access each picture stored in the main body portion of the file.

Moreover, although the explanation has been made above on the assumption that the formed partial transfer file is transferred to the outside, the invention is not limited to such an example. For instance, in a video editing apparatus or the like using a non-linear recording medium such as a hard disc drive or the like, an internal file which holds an editing process and an edition result can be also formed by the file forming method according to the embodiment of the invention.

Although the explanation has been made above on the assumption that the partial transfer file is formed with respect to the interval designated for the video data stored in the original file, the invention is not limited to such an example. For instance, the file forming method according to the invention can be also applied to a video stream.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing apparatus comprising:
a decoding interval detecting unit detecting a second interval according to coding order of frames necessary to decode a first interval which is designated by display order of the frames in video data which has been compression-encoded by using an inter-frame compression according to a predictive coding; and
a file forming unit forming a file to store the video data in said second interval detected by said decoding interval detecting unit,
wherein said file forming unit adds information showing said first interval by the frame display order to said file,
wherein, when a partial transfer in which the video data is extracted from the file so that a frame interval designated for the video data stored in the file can be reproduced and the extracted video data is transferred as a new file at a same time, the new file is formed while also including frames necessary to decode the designated frame interval,
wherein an index table is rewritten according to video data included in the new file, and
wherein, when the video data which is partially transferred is stored into the new file, a display start frame whose display is started and the number of frames from the display start frame are described in the head metadata included in a file header, and
wherein said video data is constructed by at least one frame of a first type which can be independently decoded and one or a plurality of frames of a second type which are decoded by using time-precedent and/or time-subsequent other frames as references and is encoded on a unit basis of a group which can be independently accessed, and
wherein if a designated head frame is a frame by a B picture or a P picture, a time-precedent frame is necessary in order to decode the frame, and the picture which is time-precedent to the picture corresponding to the designated head frame is included in the file, and
wherein if an end frame is a frame by a B picture, the picture which is time-subsequent to the picture corresponding to such a frame is included in the file.

2. An apparatus according to claim 1, wherein said file forming unit stores the information showing said first interval into a header portion of said file.

3. An apparatus according to claim 1, wherein:
said video data has a table in which at least first position information showing a position in the video data of each of the frames constructing the video data is described; and said file forming unit stores said table in which said first position information has been rewritten according to said second interval detected by said decoding interval detecting unit into said file.

4. An apparatus according to claim 3, wherein:
in said table, second position information showing a position of the table in said video data is further described; and
said file forming unit stores said table in which said second position information has been rewritten according to said second interval detected by said decoding interval detecting unit into said file.

5. An apparatus according to claim 1, wherein:
said file foaming unit stores said video data into said file on a unit basis of said group including said second interval detected by said decoding interval detecting unit.

6. An apparatus according to claim 1, wherein said decoding interval detecting unit detects said second interval on the basis of a type of the predictive coding of the frame at the edge of said first interval.

7. An apparatus according to claim 6, wherein:
said decoding interval detecting unit detects said second interval on the basis of whether or not said group has been encoded by using the one-precedent frame of said group.

8. A data processing method comprising the steps of:
detecting a second interval according to coding order of frames necessary to decode a first interval which is designated by display order of the frames in video data which has been compression-encoded by using an inter-frame compression according to a predictive coding; and
forming a file to store the video data in said second interval detected in said decoding interval detecting step,
wherein said file forming step includes a step of adding information showing said first interval by the frame display order to said file,
wherein, when a partial transfer in which the video data is extracted from the file so that a frame interval designated for the video data stored in the file can be reproduced and the extracted video data is transferred as a new file at a same time, the new file is formed while also including frames necessary to decode the designated frame interval,
wherein an index table is rewritten according to video data included in the new file, and
wherein, when the video data which is partially transferred is stored into the new file, a display start frame whose display is started and the number of frames from the display start frame are described in the header metadata included in a file header, and
wherein said video data is constructed by at least one frame of a first type which can be independently decoded and one or a plurality of frames of a second type which are decoded by using time-precedent and/or time-subsequent other frames as references and is encoded on a unit basis of a group which can be independently accessed, and
wherein if a designated head frame is a frame by a B picture or a P picture, a time-precedent frame is necessary in order to decode the frame, and the picture which is time-precedent to the picture corresponding to the designated head frame is included in the file, and
wherein if an end frame is a frame by a B picture, the picture which is time-subsequent to the picture corresponding to such a frame is included in the file.

9. A non-transitory computer readable medium for storing a data processing program for allowing a computer apparatus to execute a data processing method,
wherein said data processing method comprises the steps of:
detecting a second interval according to coding order of frames necessary to decode a first interval which is designated by display order of the frames in video data which has been compression-encoded by using an inter-frame compression according to a predictive coding; and
forming a file to store the video data in said second interval detected in said decoding interval detecting step,
and said file forming step includes a step of adding information showing said first interval by the frame display order to said file,
wherein, when a partial transfer in which the video data is extracted from the file so that a frame interval designated for the video data stored in the file can be reproduced and the extracted video data is transferred as a new file at a same time, the new file is formed while also including frames necessary to decode the designated frame interval,
wherein an index table is rewritten according to video data included in the new file, and
wherein, when the video data which is partially transferred is stored into the new file, a display start frame whose display is started and the number of frames from the display start frame are described in the header metadata included in a file header, and
wherein said video data is constructed by at least one frame of a first type which can be independently decoded and one or a plurality of frames of a second type which are decoded by using time-precedent and/or time-subsequent other frames as references and is encoded on a unit basis of a group which can be independently accessed, and
wherein if a designated head frame is a frame by a B picture or a P picture, a time-precedent frame is necessary in order to decode the frame, and the picture which is time-precedent to the picture corresponding to the designated head frame is included in the file, and
wherein if an end frame is a frame by a B picture, the picture which is time-subsequent to the picture corresponding to such a frame is included in the file.

10. A non-transitory computer readable medium for storing a data structure including at least:
video data in a second interval according to coding order of frames necessary to decode a first interval which is designated by display order of the frames in video data which has been compression-encoded by using an inter-frame compression according to a predictive coding; and
information showing said first interval by the frame display order,
wherein, when a partial transfer in which the video data is extracted from the file so that a frame interval designated for the video data stored in the file can be reproduced and the extracted video data is transferred as a new file at a same time, the new file is formed while also including frames necessary to decode the designated frame interval,
wherein an index table is rewritten according to video data included in the new file, and
wherein, when the video data which is partially transferred is stored into the new file, display start frame whose display is started and the number of frames from the display start frame are described in the header metadata included in a file header, and
wherein said video data is constructed by at least one frame of a first type which can be independently decoded and one or a plurality of frames of a second type which are decoded by using time-precedent and/or time-subsequent other frames as references and is encoded on a unit basis of a group which can be independently accessed, and
wherein if a designated head frame is a frame by a B picture or a P picture, a time-precedent frame is necessary in order to decode the frame, and the picture which is time-precedent to the picture corresponding to the designated head frame is included in the file, and
wherein if an end frame is a frame by a B picture, the picture which is time-subsequent to the picture corresponding to such a frame is included in the file.

11. The non-transitory computer readable medium for storing a structure according to claim 10, further comprising a table in which at least first position information showing a position in the video data of each of the frames constructing said video data is described.

12. The non-transitory computer readable medium for storing a structure according to claim 11, wherein second position information showing a position of the table in said video data is further described in said table.

13. The non-transitory computer readable medium for storing a structure according to claim 10, wherein:
said video data is constructed by at least one frame of a first type which can be independently decoded and one or a plurality of frames of a second type which are decoded by using time-precedent and/or time-subsequent other frames as references and is encoded on a unit basis of a group which can be independently accessed; and
said video data is stored on a unit basis of said group including said second interval.

14. A recording device in which a file having a data structure has been recorded, wherein
said data structure includes at least:
video data in a second interval according to coding order of frames necessary to decode a first interval which is designated by display order of the frames in video data which has been compression-encoded by using an inter-frame compression according to a predictive coding; and
information showing said first interval by the frame display order,
wherein, when a partial transfer in which the video data is extracted from the file so that a frame interval designated for the video data stored in the file can be reproduced and the extracted video data is transferred as a new file at a same time, the new file is formed while also including frames necessary to decode the designated frame interval,
wherein an index table is rewritten according to video data included in the new file and
wherein, when the video data which is partially transferred is stored into the new file, a display start frame whose display is started and the number of frames from the display start frame are described in the header metadata included in a file header, and
wherein said video data is constructed by at least one frame of a first type which can be independently decoded and one or a plurality of frames of a second type which are decoded by using time-precedent and/or time-subsequent other frames as references and is encoded on a unit basis of a group which can be independently accessed, and
wherein if a designated head frame is a frame by a B picture or a P picture, a time-precedent frame is necessary in order to decode the frame, and the picture which is time-precedent to the picture corresponding to the designated head frame is included in the file, and wherein if an end frame is a frame by a B picture, the picture which is time-subsequent to the picture corresponding to such a frame is included in the file.

15. The device according to claim 14, wherein the information showing said first interval is stored into a header portion of said file.

16. The device according to claim 14, wherein said file further includes a table in which at least first position information showing a position in the video data of each of the frames constructing said video data is described.

17. The device according to claim 16, wherein second position information showing a position of the table in said video data is further described in said table.

18. The device according to claim 14, wherein:
said video data is constructed by at least one frame of a first type which can be independently decoded and one or a plurality of frames of a second type which are decoded by using time-precedent and/or time-subsequent other frames as references and is encoded on a unit basis of a group which can be independently accessed; and
said video data is stored into said file on a unit basis of said group including said second interval.

19. A reproducing apparatus for reproducing video data which has been compression-encoded by using a frame compression according to a predictive coding and has been recorded in a recording medium, comprising:
a reproducing unit reproducing the data from the recording medium;
a decoding unit decoding the video data reproduced by said reproducing unit; and
an output control unit controlling an output of said video data decoded by said decoding unit on a frame unit basis,
wherein, when a partial transfer in which the video data is extracted from the file so that a frame interval designated for the video data stored in the file can be reproduced and the extracted video data is transferred as a new file at a same time, the new file is formed while also including frames necessary to decode the designated frame interval,
wherein an index table is rewritten according to video data included in the new file, and
wherein, when the video data which is partially transferred is stored into the new file, a display start frame whose display is started and the number of frames from the display start frame are described in the header metadata included in a file header,
wherein a file having a data structure is reproduced by said reproducing unit, said data structure includes at least the video data in a second interval according to coding order of frames necessary to decode a first interval which is designated by display order of the frames in the video data which has been compression-encoded by using an inter-frame compression according to the predictive coding and has been recorded in the recording medium and information showing said first interval by the frame display order, and when said video data included in the reproduced file is decoded,
said output control unit controls so as to output said video data from the head frame in said first interval on the basis of the information which is included in said file and shows said first interval by the frame display order, and
wherein said video data is constructed by at least one frame of a first type which can be independently decoded and one or a plurality of frames of a second type which are decoded by using time-precedent and/or time-subsequent other frames as references and is encoded on a unit basis of a group which can be independently accessed, and wherein if a designated head frame is a frame by a B picture or a P picture, a time-precedent frame is necessary in order to decode the frame, and the picture which is time-precedent to the picture corresponding to the designated head frame is included in the file, and wherein if an end frame is a frame by a B picture, the picture which is time-subsequent to the picture corresponding to such a frame is included in the file.

20. An apparatus according to claim 19, wherein the information showing said first interval is stored into a header portion of said file.

21. An apparatus according to claim 19, wherein said file further includes a table in which at least first position information showing a position in the video data of each of the frames constructing said video data is described.

22. An apparatus according to claim 21, wherein second position information showing a position of the table in said video data is further described in said table.

23. An apparatus according to claim 19, wherein:
said video data is constructed by at least one frame of a first type which can be independently decoded and one or a plurality of frames of a second type which are decoded by using time-precedent and/or time-subsequent other frames as references and is encoded on a unit basis of a group which can be independently accessed; and
said video data is stored into said file on a unit basis of said group including said second interval.

24. A reproducing method of reproducing video data which has been compression-encoded by using a frame compression according to a predictive coding and has been recorded in a recording medium, comprising the steps of:
reproducing the data from the recording medium;
decoding the reproduced video data; and
controlling an output of said decoded video data on a frame unit basis,
wherein, when a partial transfer in which the video data is extracted from the file so that a frame interval designated for the video data stored in the file can be reproduced and the extracted video data is transferred as a new file at a same time, the new file is formed while also including frames necessary to decode the designated frame interval,
wherein an index table is rewritten according to video data included in the new file, and
wherein, when the video data which is partially transferred is stored into the new file, a display start frame whose display is started and the number of frames from the display start frame are described in the header metadata included in a file header,
wherein a file having a data structure is reproduced, said data structure includes at least the video data in a second interval according to coding order of frames necessary to decode a first interval which is designated by display order of the frames in the video data which has been compression-encoded by using an inter-frame compression according to the predictive coding and has been recorded in the recording medium and information showing said first interval by the frame display order, and when said video data included in the reproduced file is decoded,
in said output control step, control is made so as to output said video data from the head frame in said first interval on the basis of the information which is included in said file and shows said first interval by the frame display order, and wherein said video data is constructed by at least one frame of a first type which can be independently decoded and one or a plurality of frames of a second type which are decoded by using time-precedent and/or time-subsequent other frames as references and is encoded on a unit basis of a group which can be independently accessed, and wherein if a designated head frame is a frame by a B picture or a P picture, a time-precedent frame is necessary in order to decode the frame, and the picture which is time-precedent to the picture corresponding to the designated head frame is included in the file, and wherein if an end frame is a frame by a B picture, the picture which is time-subsequent to the picture corresponding to such a frame is included in the file.

25. A non-transitory computer readable medium for storing a reproducing program for allowing a computer apparatus to execute a method of reproducing video data which has been compression-encoded by using a frame compression according to a predictive coding and has been recorded in a recording medium, wherein the reproducing method comprises the steps of:
reproducing the data from the recording medium;
decoding the reproduced video data; and
controlling an output of said decoded video data on a frame unit basis, a file having a data structure is reproduced, said data structure includes at least the video data in a second interval according to coding order of frames necessary to decode a first interval which is designated by display order of the frames in the video data which has been compression-encoded by using an inter-frame compression according to the predictive coding and has been recorded in the recording medium and information showing said first interval by the frame display order, and when said video data included in the reproduced file is decoded, in said output control step, control is made so as to output said video data from the head frame in said first interval on the basis of the information which is included in said file and shows said first interval by the frame display order, wherein, when a partial transfer in which the video data is extracted from the file so that a frame interval designated for the video data stored in the file can be reproduced and the extracted video data is transferred as a new file at a same time the new file is formed while also including frames necessary to decode the designated frame interval, wherein an index table is rewritten according to video data included in the new file, and wherein, when the video data which is partially transferred is stored into the new file, a display start frame whose display is started and the number of frames from the display start frame are described in the header metadata included in a file header, and wherein said video data is constructed by at least one frame of a first type which can be independently decoded and one or a plurality of frames of a second type which are decoded by using time-precedent and/or time-subsequent other frames as references and is encoded on a unit basis of a group which can be independently accessed, and wherein if a designated head frame is a frame by a B picture or a P picture, a time-precedent frame is necessary in order to decode the frame, and the picture which is time-precedent to the picture corresponding to the designated head frame is included in the file, and wherein if an end frame is a frame by a B picture, the picture which is time-subsequent to the picture corresponding to such a frame is included in the file.

* * * * *